(12) United States Patent
Sakano

(10) Patent No.: US 7,432,633 B2
(45) Date of Patent: Oct. 7, 2008

(54) ULTRASONIC DRIVING APPARATUS

(75) Inventor: Hiromichi Sakano, Tokyo (JP)

(73) Assignee: Olympus Corporation, Tokyo (JP)

( * ) Notice: Subject to any disclaimer, the term of this patent is extended or adjusted under 35 U.S.C. 154(b) by 224 days.

(21) Appl. No.: 11/337,955

(22) Filed: Jan. 23, 2006

(65) Prior Publication Data

US 2006/0186760 A1    Aug. 24, 2006

(30) Foreign Application Priority Data

Jan. 28, 2005  (JP) .................... 2005-021561

(51) Int. Cl.
   *H01L 41/08* (2006.01)
(52) U.S. Cl. ................................ 310/323.02
(58) Field of Classification Search ............. 310/323.02
   See application file for complete search history.

(56) References Cited

U.S. PATENT DOCUMENTS

| | | | | |
|---|---|---|---|---|
| 5,191,688 A * | 3/1993 | Takizawa et al. | ........... | 29/25.35 |
| 6,211,603 B1 * | 4/2001 | Iino et al. | .............. | 310/323.02 |
| 6,242,846 B1 * | 6/2001 | Ashizawa et al. | ...... | 310/323.02 |
| 7,129,621 B2 * | 10/2006 | Sakano et al. | .......... | 310/323.09 |
| 7,242,131 B2 * | 7/2007 | Kishi et al. | ............ | 310/323.02 |
| 7,259,497 B2 * | 8/2007 | Sakano et al. | .......... | 310/323.02 |
| 7,268,464 B2 * | 9/2007 | Kishi | ..................... | 310/323.02 |
| 2004/0056564 A1 | 3/2004 | Iino et al. | | |

FOREIGN PATENT DOCUMENTS

JP    2004-96984    3/2004

* cited by examiner

*Primary Examiner*—Mark Budd
(74) *Attorney, Agent, or Firm*—Scully, Scott, Murphy & Presser, P.C.

(57) ABSTRACT

The invention provides an ultrasonic driving apparatus in which an oscillator contained therein is pressed against a driven member and can be positioned with a high degree of precision. The invention includes an oscillator for generating vibrations when supplied with electrical power; a holding member fixed to the oscillator; an urging member for urging the oscillator in a predetermined direction; and a support member for supporting the holding member so as to be capable of moving in the predetermined direction, wherein positioning portions for setting, with a certain degree of precision, the position of the oscillator which is projected onto a plane substantially orthogonal to the predetermined direction are provided in the holding member and the support member.

12 Claims, 17 Drawing Sheets

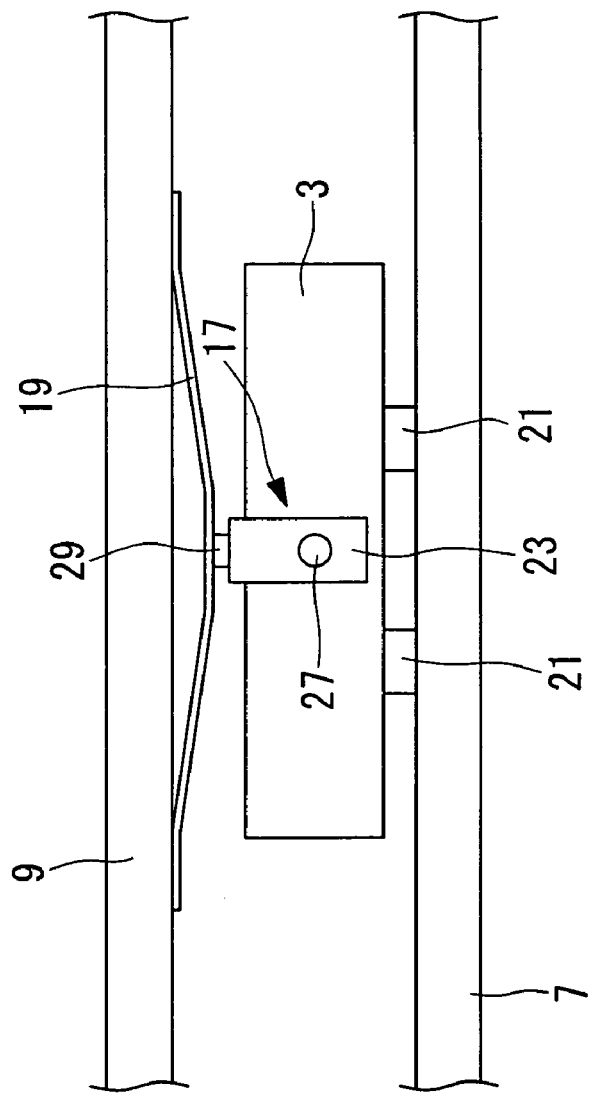
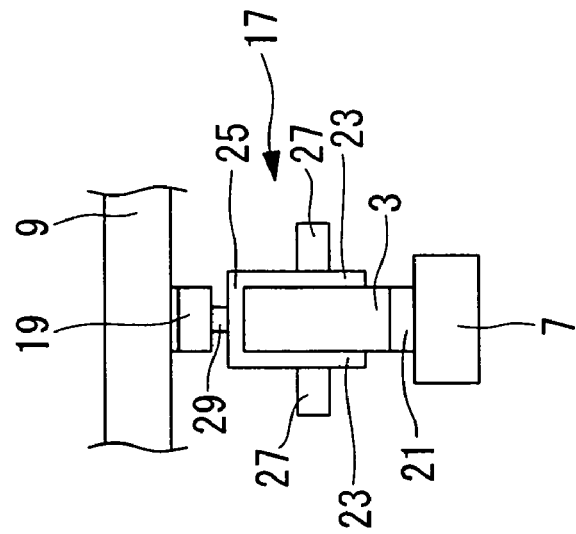
FIG. 3A
FIG. 3B

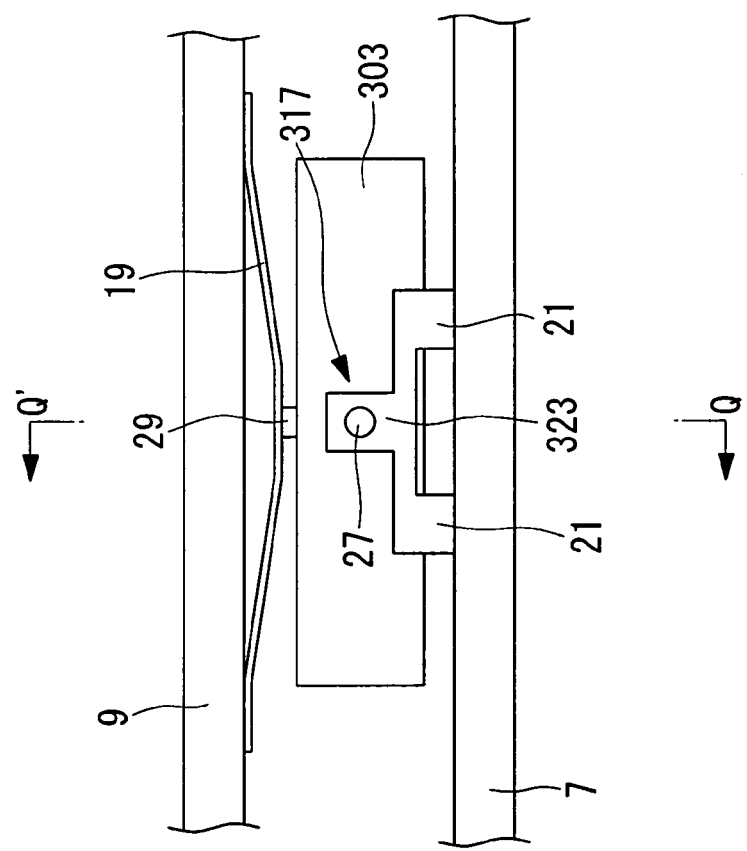

ULTRASONIC DRIVING APPARATUS

BACKGROUND OF THE INVENTION

1. Field of the Invention

The present invention relates to an ultrasonic driving apparatus.

This application is based on Japanese Patent Application No. 2005-021561, the content of which is incorporated herein by reference.

2. Description of Related Art

Recently, ultrasonic motors (ultrasonic driving apparatuses) using the vibration of an oscillator such as a piezoelectric device have been receiving attention as new types of motor for replacing electromagnetic motors. These ultrasonic motors have numerous advantages, including their low speed and high thrust without a gear, high holding power, long stroke, high resolution, quiet operation, absence of electromagnetic noise produced, imperviousness to electromagnetic noise, and so forth.

Among the advantages mentioned above, in order to exhibit, in particular, superior positioning performance such as high resolution, it is necessary to position the oscillator of the ultrasonic motor with high precision.

However, when the oscillator is fixed to an attachment member or the like having high rigidity, there is the drawback that the generation of vibrations by the oscillator is inhibited, which deteriorates the performance of the ultrasonic motor. Moreover, when fixing the oscillator to an elastic member or the like in order not to inhibit the generation of vibrations by the oscillator, there is the problem of deteriorated positioning precision due to deformation of the elastic member and so forth.

Therefore, a holding structure and a holding method have been proposed for setting the position of the oscillator in the ultrasonic motor with high precision without inhibiting the generation of vibrations by the oscillator.

Japanese Unexamined Patent Application Publication No. 2004-96984 discloses a technology using an urging member, such as a pin, for pushing the oscillator against a driven member to position the oscillator.

However, when positioning the oscillator using the urging member, there is a problem in that it is difficult to improve the positioning precision. Specifically, although the urging member is endowed with elasticity for urging the oscillator, since this elasticity permits motion of the oscillator, there is a problem in that the positioning precision of the oscillator is reduced.

BRIEF SUMMARY OF THE INVENTION

The present invention has been conceived to solve the problems described above, and an object thereof is to provide an ultrasonic driving apparatus in which an oscillator contained therein can be pressed against a member to be driven and can be located with a high degree of positional accuracy.

In order to realize the above-described object, the present invention provides the following solutions.

The present invention provides an ultrasonic driving apparatus including an oscillator for generating vibrations when supplied with electrical power; a holding member fixed to the oscillator; an urging member for urging the oscillator in a predetermined direction; and a support member for supporting the holding member so as to be capable of moving in the predetermined direction. Positioning portions for setting, with a certain degree of precision, the position of the oscillator which is projected onto a plane substantially orthogonal to the predetermined direction are provided in the holding member and the support member.

According to the present invention, because the urging member for urging the oscillator and the positioning portion keeping the position of the oscillator substantially constant are separated, deterioration of the positioning accuracy of the oscillator can be prevented. That is, because the urging member and the positioning portion are separated, it is not necessary to endow the positioning portion with elasticity, which allows the positioning accuracy of the oscillator to be improved.

Because the support member, which is provided with the positioning portion, supports the oscillator in such manner as to allow movement in the predetermined direction, the oscillator is urged in the predetermined direction. Also, because the urging member and the positioning portion are separated, balance of the oscillator can be easily achieved. Therefore, when the driven body is disposed in the predetermined direction, the oscillator can be made to contact the driven body at a predetermined orientation and press it.

In the aspect of the invention described above, the holding member preferably includes a pair of side-wall portions which sandwich at least the oscillator in a direction intersecting the predetermined direction; and the positioning portions preferably include projections that protrude from the side-wall portions and groove portions, extending in the predetermined direction in opposing faces that contact the side-wall portions, for accommodating the projections in such a manner that the projections are capable of moving in the predetermined direction.

With such a configuration, because the side-wall portions sandwich and support the oscillator in a direction intersecting the predetermined direction and because they are disposed so that the side-wall portions and the opposing faces make contact, it is possible to position the oscillator in the intersecting direction with a certain degree of precision. Also, because the projections provided in the side-wall portions are inserted into the groove portions of the support member in such a manner as to allow movement in the predetermined direction, and because the movement of the oscillator is restricted to the direction intersecting the predetermined direction, it is possible to position the oscillator with a certain degree of precision. Therefore, it is possible to set, with a certain degree of precision, the position where it is projected onto a plane substantially orthogonal to the predetermined position of the oscillator.

Because the projections are inserted into the groove portions in the support member in such a manner as to allow movement in the predetermined direction, the oscillator can be supported so as to allow movement in the predetermined direction and can be urged in the predetermined direction.

In the configuration described above, preferably, the holding member includes a base portion that joins the pair of side-wall portions; and the oscillator is pressed by the urging member, via the base portion.

By doing so, the pair of side-wall portions can be joined via the base portion to form a single piece; therefore, the number of component parts of the holding member can be reduced.

In the configuration described above, the side-wall portions are fixed at a contact face contacting the oscillator.

In the configuration described above, preferably, the holding member includes a base portion that joins the pair of side-wall portions; the oscillator is pressed by the urging member, via the base portion; and the base portion is fixed at a contact face contacting the oscillator.

By doing so, for example, the surface area used for fixing can be reduced compared to case where side-wall portions and the base portion are fixed at the contact surface contacting the oscillator. Therefore, inhibition of the oscillator vibrations can be prevented, and a reduction in the vibration efficiency of the oscillator can thus be prevented.

In the configuration described above, preferably, the holding member includes a base portion that joins the pair of side-wall portions; the oscillator is pressed by the urging member, via the base portion; the base portion is fixed at a contact face contacting the oscillator; and a gap is formed between the oscillator and the side-wall portions.

Since, by doing so, the side-wall portions contact the oscillator, it is possible to prevent the oscillator vibrations from being inhibited, and therefore, a reduction in the vibration efficiency of the oscillator can be prevented.

In the configuration described above, preferably, the holding member includes a base portion that joins the pair of side-wall portions; the oscillator is pressed by the urging member, via the base portion; and the side-wall portions and the base portion are fixed at a contact face contacting the oscillator.

By doing so, the contact area used for fixing can be increased compared, for example, to a case where the side-wall portions are fixed at a contact face contacting the oscillator, or a case where the base portion is fixed at a contact face contacting the oscillator, which allows the oscillator to be held more reliably.

In the configuration described above, preferably, the holding member includes a base portion that joins the pair of side-wall portions; the oscillator is pressed by the urging member, via the base portion; the holding member is formed of resin; and the holding member is integrally formed with the positioning portion and is fixed to the oscillator.

Accordingly, because the holding member and the positioning portions provided on the holding member are integrally formed, the number of component parts can be reduced, and the number of processes for assembling the oscillator can also be reduced.

Because the holding member and the positioning portions are integrally formed with the oscillator, it is possible to eliminate a process required for attaching the holding member and the positioning portion to the oscillator. Also, because the holding member and so forth can be directly attached to the oscillator by means of the integrated structure, it is not necessary to form a member for attaching to the oscillator, and material costs can thus be reduced.

As described above, outsert molding, for example, can be used as the method of integrally forming the oscillator and the holding member.

In the aspect of the invention described above, preferably, the holding member is formed of resin; and the holding member is integrally formed with the positioning portions and is fixed to the oscillator. In addition, the aspect of the invention described above preferably further includes a driven body that is driven by vibrations generated by the oscillator and a driving contact portion disposed between the oscillator and the driven body, and the driving contact portion is preferably integrally formed with the holding member.

Accordingly, by integrally forming the driving contact portion with the holding member, it is possible to reduce the number of component parts, and it is also possible to reduce the number of steps required for assembling the oscillator.

Furthermore, because the driving contact portion is disposed between the oscillator and the driven body, by using, for example, a driving contact portion made of a material suitable for driving the driven body, it is possible to improve the driving efficiency of the driven body.

In the aspect of the invention described above, preferably, the holding member is formed of resin; and the holding member is integrally formed with the positioning portions and is fixed to the oscillator. In addition, in the aspect of the invention described above, a through-hole, extending in a direction intersecting the vibration direction, is preferably formed at the position of a vibration node in the oscillator; and in the region where the through-hole is formed, preferably, at least the holding member is integrally formed with the oscillator.

Accordingly, by forming the holding member in the region where the through-hole is formed, the holding member is fixed to the oscillator via the through-hole. As a result, because the holding member can be reduced in size compared to a method where the holding member is formed around the oscillator, it is possible to prevent vibrations of the oscillator from being inhibited, which allows a reduction in vibration efficiency to be prevented.

With the ultrasonic driving apparatus of the present invention, because the urging member for urging the oscillator in the predetermined direction and the positioning portion for keeping the position of the oscillator substantially constant are separated, an advantage is afforded in that it is possible to position the oscillator with a high degree of precision. Furthermore, because the support member, which is provided with the positioning portion, supports the oscillator in such a manner as to allow movement in the predetermined direction, an advantage is afforded in that it is possible to press the oscillator in the predetermined direction.

BRIEF DESCRIPTION OF THE SEVERAL VIEWS OF THE DRAWINGS

FIG. 3 is a diagram showing constituent elements attached to a piezoelectric device in FIG. 1.

FIGS. 17A, 17B, and 17C are diagrams showing the configuration of a piezoelectric device in FIG. 16.

DETAILED DESCRIPTION OF THE INVENTION

First Embodiment

An ultrasonic driving apparatus according to a first embodiment of the present invention will be described below with reference to FIGS. 1 to 5. This embodiment is described in terms of an example in which the ultrasonic driving apparatus is used as an ultrasonic motor for driving a lens in a camera.

Figure 1:
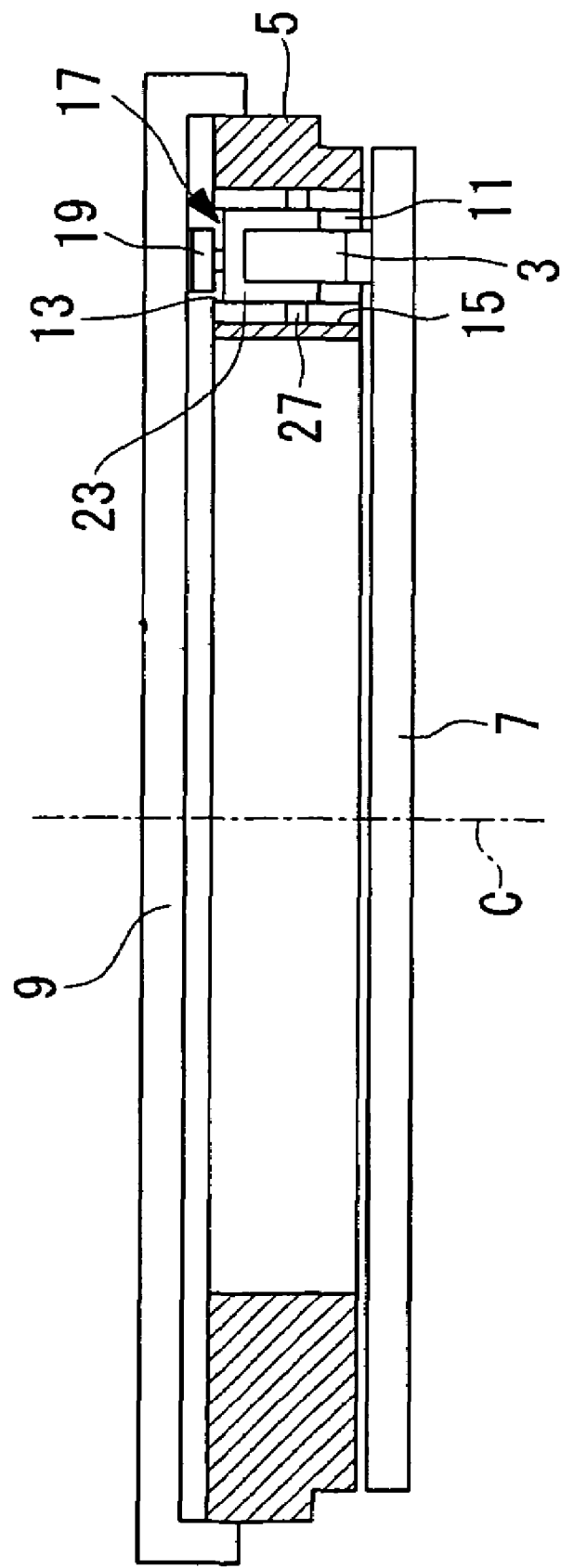
FIG. 1 is a cross-sectional view showing the overall configuration of an ultrasonic motor according to a first embodiment of the present invention.
Figure 2:
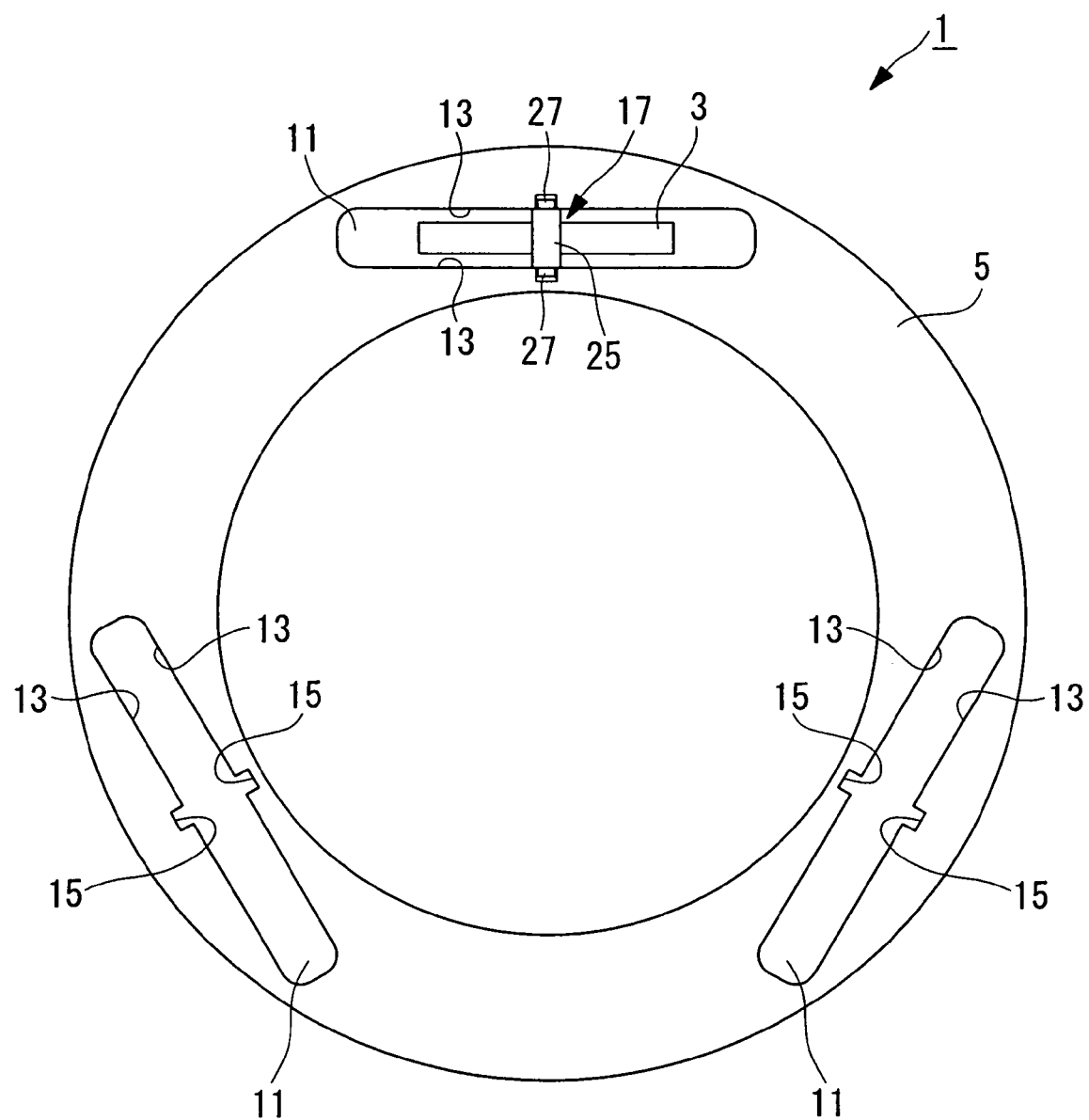
FIG. 2 is a plan view showing the configuration of the ultrasonic motor in FIG. 1.

FIG. 1 is a cross-sectional view depicting the overall configuration of an ultrasonic motor according to the present embodiment. FIG. 2 is a partial plan view depicting the configuration of the ultrasonic motor in FIG. 1.

As shown in FIGS. 1 and 2, an ultrasonic motor (ultrasonic driving apparatus) 1 is mainly formed of a piezoelectric device (oscillator) 3 that produces ultrasonic vibrations when supplied with electrical power, a case (support member) 5 in which the piezoelectric device 3 is contained, a driven body 7 that is vibrated by the ultrasonic vibrations from the piezoelectric device 3, and a cover 9 for pressing the piezoelectric device 3.

A conversion mechanism (not shown in the drawing) for converting the rotary motion of the driven body 7 into motion in a direction parallel to a central axis C (a predetermined direction) is connected to the driven body 7, and the position of the camera lens (not shown in the drawings) is moved in the direction along the central axis C using the conversion mechanism.

The case 5 is formed to be substantially ring-shaped, and locating holes 11 in which the piezoelectric device 3 is positioned are formed therein. The locating holes 11 are formed to be substantially prism-shaped and three of them are formed at regular intervals around a circle. Guide grooves (positioning portions, groove portions) 15 in which pin sections (to be described later) are to be inserted are formed in guide surfaces (positioning portions, opposing surfaces) 13 that are substantially orthogonal to the radial direction in the locating hole 11. The guide groove 15 is formed to be substantially parallel to the central axis C of the case 5.

As shown in FIG. 1, the driven body 7 is formed to be substantially ring-shaped and is positioned so as to have a central axis in common with the central axis C of the case 5. It is also positioned so that a driving contact portion (to be described later) of the piezoelectric device 3 is in contact with the surface of the driven body 7 that opposes the piezoelectric device 3.

The cover 9, which has a rim portion, is formed to be substantially ring-shaped and is positioned so as to have a central axis in common with the central axis C of the case 5. Also, the cover 9 is positioned so that a leaf spring 19 of the piezoelectric device 3 (to be described later) is in contact with a surface of the cover 9 that opposes the piezoelectric device 3.

FIGS. 3A and 3B are diagrams depicting constituent elements attached to the piezoelectric device 3 in FIG. 1. FIG. 3A shows the piezoelectric device 3 as viewed from the radial direction of the ultrasonic motor, and FIG. 3B shows the piezoelectric device as viewed from the circumferential direction.

As shown in FIGS. 1 to 3, the piezoelectric device 3 is formed as a substantially rectangular solid having a longitudinal axis in the circumferential direction of the case 5. The piezoelectric device 3 includes a holding part (holding member) 17 for holding the piezoelectric device 3, the leaf spring (urging member) 19 for urging the piezoelectric device 3 towards the driven body 7, and driving contact portions 21 that make contact with the driven body 7.

The holding part 17 is mainly formed of side-wall portions (positioning portions) 23 for holding the piezoelectric device 3 in the radial direction of the ultrasonic motor 1, a base portion 25 for holding the piezoelectric motor 3 in a direction along the central axis C, and substantially cylindrical pin portions (positioning portions, projecting portions) 27 that are formed so as to project from the side-wall portions 23 in the radial direction described above.

The holding part 17 is positioned substantially at the center of the piezoelectric device 3, which is a vibration node, and likewise, the pin portions 27 are also positioned substantially at the center where the vibration node occurs. Accordingly, the generation of vibrations in the piezoelectric device 3 is not prevented, even though the piezoelectric device 3 is held by the holding part 17, and therefore, the vibration generation efficiency can be prevented from deteriorating.

Furthermore, since the pin portions 27 are formed to be substantially cylindrical, the piezoelectric device 3 is supported in such a manner that it is capable of rotating about the pin portions 27 and can thus freely follow variations of the driven body 7.

The holding part 17 and the piezoelectric device 3 are fixed to each other using an adhesive. Possible examples of this adhesive include epoxy resin, silicone resin, or the like. When using an adhesive containing a comparatively soft material, such as silicone resin, it is more difficult for the impedance characteristics of the piezoelectric device 3 to be deteriorated.

Figure 4:
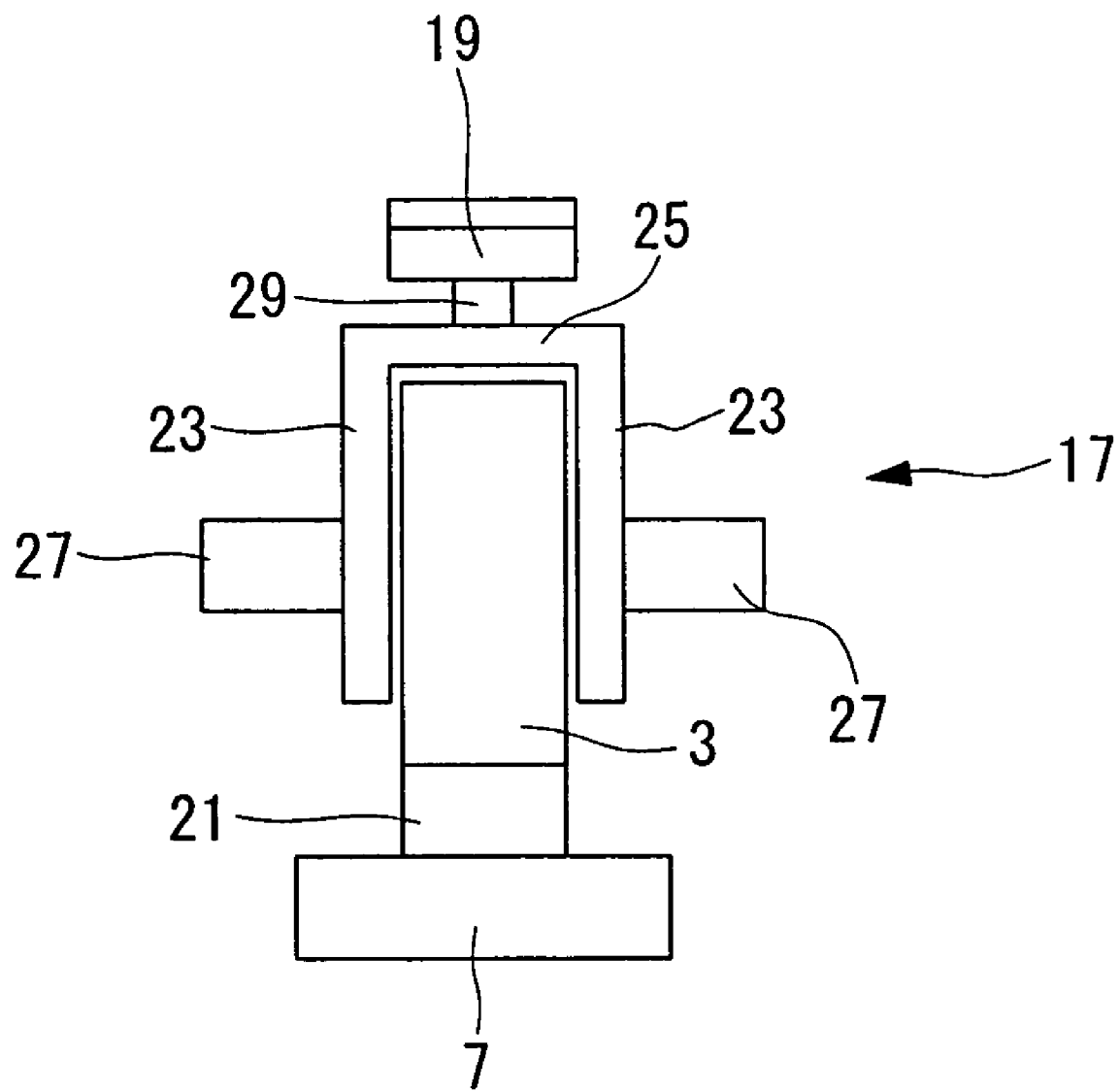
FIG. 4 is a diagram illustrating a method of fixing the piezoelectric device and a holding part in FIG. 1.

FIG. 4 is a diagram illustrating the method of fixing the piezoelectric device 3 and the holding part 17 in FIG. 1.

As shown in FIG. 4, the fixing surface of the holding part 17 and the piezoelectric device 3 may be the interface between the side-wall portions 23 and the piezoelectric device 3, the interface between the base portion 25 and the piezoelectric device 3, or the interfaces between piezoelectric device 3 and both the side-wall portions 23 and the base portion 25.

When fixing the holding part 17 and the piezoelectric device 3 at the side-wall portions 23 and when fixing them at the base portion 25, since the fixing area is smaller than when fixing them at both the side-wall portions 23 and the base portion 25, the vibration of the piezoelectric device 3 is not inhibited, and therefore, the vibration efficiency of the piezoelectric device 3 can be improved. Also, when the holding part 17 and the piezoelectric device 3 are fixed at both the side-wall portions 23 and the base portion 25, the piezoelectric device 3 can be held more reliably.

The leaf spring 19 is formed in a shape that projects towards the piezoelectric device 3, and a substantially cylindrical pressing part 29 is formed to project towards the base portion 25 from substantially the center thereof. Both ends of the leaf spring 19 contact the cover 9, and the pressing part 29 is disposed so as to make contact with the base portion 25. Therefore, the leaf spring 19 can press the piezoelectric device 3 with a certain urging force. When the pressing part 29 directly contacts the piezoelectric device 3, because it makes point contact with the piezoelectric device 3, the piezoelectric device 3 can be urged without inhibiting the vibration of the piezoelectric device 3.

The driving contact portions 21 are formed in the shape of substantially rectangular solids and are disposed between the piezoelectric device 3 and the driven body 7. Two driving contact portions 21 are disposed at the vibration nodes of the piezoelectric device 3. Therefore, the vibration of the piezoelectric device 3 can be efficiently transferred to the driven body 7.

Figure 5:
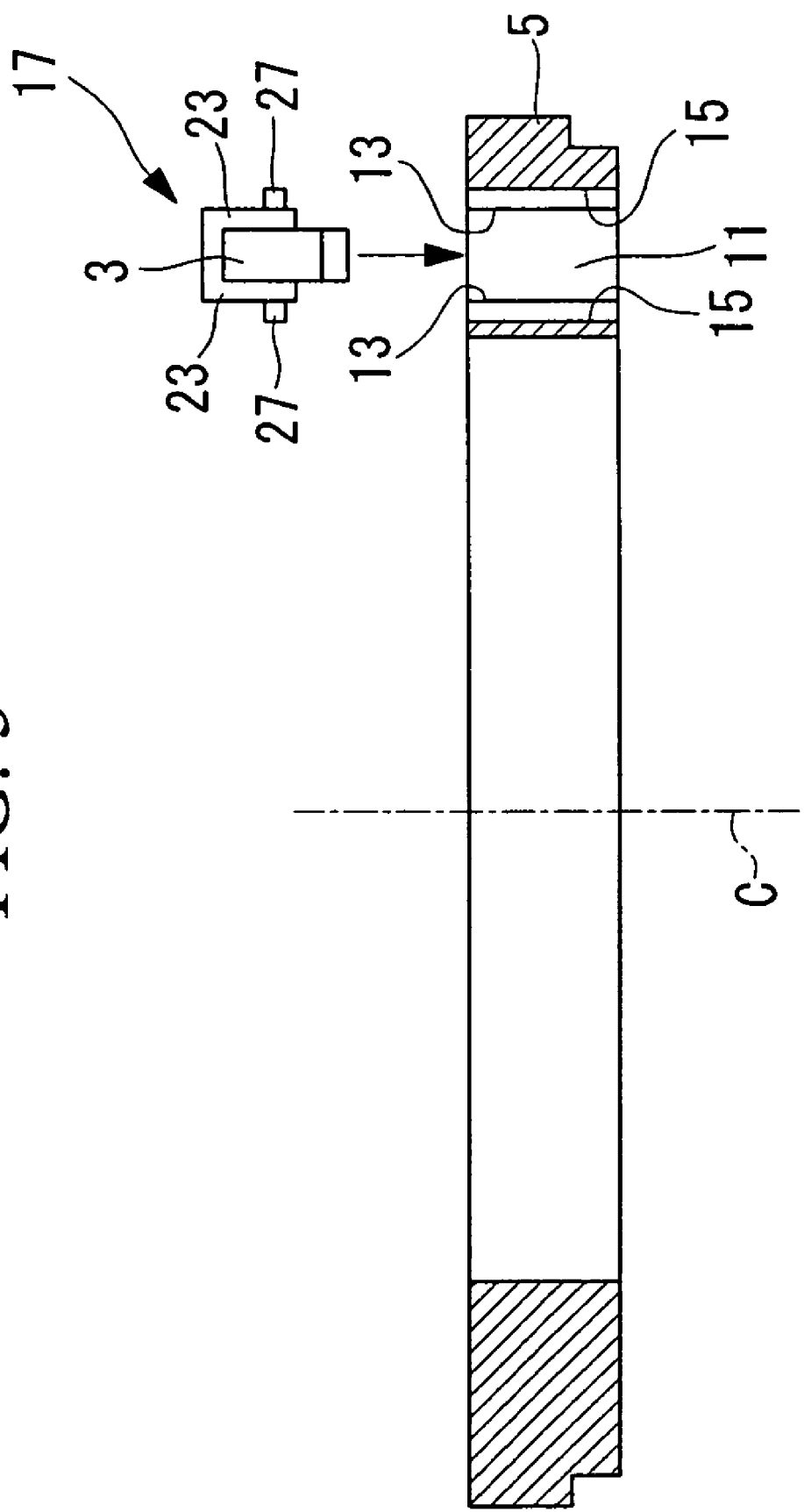
FIG. 5 is a diagram illustrating combining of the piezoelectric device and a case in FIG. 1.

FIG. 5 is a diagram depicting the combination of the piezoelectric device 3 and the case 5 in FIG. 1.

As shown in FIG. 5, the piezoelectric device 3 is inserted into the locating hole 11 in the case 5 in the direction of the central axis C. When disposed in the locating hole 11, the side-wall portions 23 of the holding part 17 in the piezoelectric device 3 and the guide surfaces 13 of the locating hole 11 oppose and abut against each other.

The pin portions 27 of the holding part 17 are engaged in such a manner that they move in the direction of the central axis C along the guide grooves 15 in the locating hole 11.

The operation of the ultrasonic motor 1 having the above configuration will be described next.

As shown in FIGS. 1 to 3, the cover 9 presses the leaf spring 19 towards the piezoelectric device 3 in a direction along the central axis C, and the piezoelectric device 3 is urged towards the driven body 7 by the leaf spring 19. The piezoelectric device 3 is pressed against the driven body 7 with a predetermined force by the leaf spring 19, and predetermined vibrations are generated by supplying electrical power thereto to drive the driven body 7.

As shown in FIGS. 1 and 2, the piezoelectric device 3 is positioned with a certain degree of precision by disposing it in the locating hole 11 in the case 5. More concretely, by abutting the side-wall portions 23 of the holding part 17 and the guide surfaces 13 of the locating hole 11, the piezoelectric device 3 is positioned with a certain degree of precision in the radial direction of the case 5. Also, by engaging the pin portions 27 of the holding part 17 with the guide grooves 15 of the locating hole 11, the piezoelectric device 3 is positioned with a certain degree of precision in the circumferential direction of the case 5.

With the configuration described above, since the leaf spring 19 for urging the piezoelectric device 3 in a direction along the central axis C, and the guide surfaces 13, the side-wall portions 23, the guide grooves 15, and the pin portions 27 for keeping the position of the piezoelectric device 3 substantially constant are separated, it is possible to prevent deterioration of the positioning precision of the piezoelectric device 3. That is, since the leaf spring 19 is provided separately from the guide surfaces 13, the side-wall portions 23, the guide grooves 15, and the pin portions 27, it is not necessary to endow the guide surfaces 13, the side-wall portions 23, the guide grooves 15, and the pin portions 27 with elasticity, and it is thus possible to improve the positioning precision of the piezoelectric device 3.

Furthermore, since the leaf spring 19 is provided separately from the guide surfaces 13, the side-wall portions 23, the guide grooves 15, and the pin portions 27, the balance of the piezoelectric device 3 can be easily maintained, and it can properly make contact with the driven body 7.

The side-wall portions 23 support the piezoelectric device 3 in the radial direction of the case 5 and are disposed so as to abut against the guide surfaces 13, which oppose the side-wall portions 23. Therefore, it is possible to position the piezoelectric device 3 with a certain degree of precision in the radial direction of the case 5. Furthermore, because the pin portions 27 provided in the side-wall portion 23 are engaged with the guide grooves 15, the piezoelectric device 3 can be positioned with a certain degree of precision in the circumferential direction of the case 5. Therefore, the piezoelectric device 3 can be positioned with a certain degree of precision at a position where it is projected onto a plane substantially orthogonal to the direction along the central axis C.

Furthermore, because the pin portions 27 are engaged with the guide grooves 15 so as to be capable of moving in a direction along the optical axis C, the piezoelectric device 3 is supported in such a manner as to be capable of moving in a direction along the central axis C and is urged towards the driven body 7.

Furthermore, it is not necessary to form an indented portion in the piezoelectric device 3 for positioning, unlike the configuration shown in FIG. 1 and so on in Japanese Unexamined Patent Application Publication No. 2004-96984. Therefore, deterioration of the vibration characteristics of the piezoelectric device 3 due to the formation of such an indented portion can be prevented and additional processing becomes unnecessary, thus improving the processing precision.

Second Embodiment

Next, a second embodiment of the present invention will be described with reference to FIGS. 6 and 7.

The basic configuration of the ultrasonic motor according to this embodiment is the same as that of the first embodiment described above, but the configuration of a holding part is different from that in the first embodiment. Therefore, in this embodiment, only the holding part shall be described using FIGS. 6 and 7, and the description of a cover and other elements will be omitted.

Figure 6:
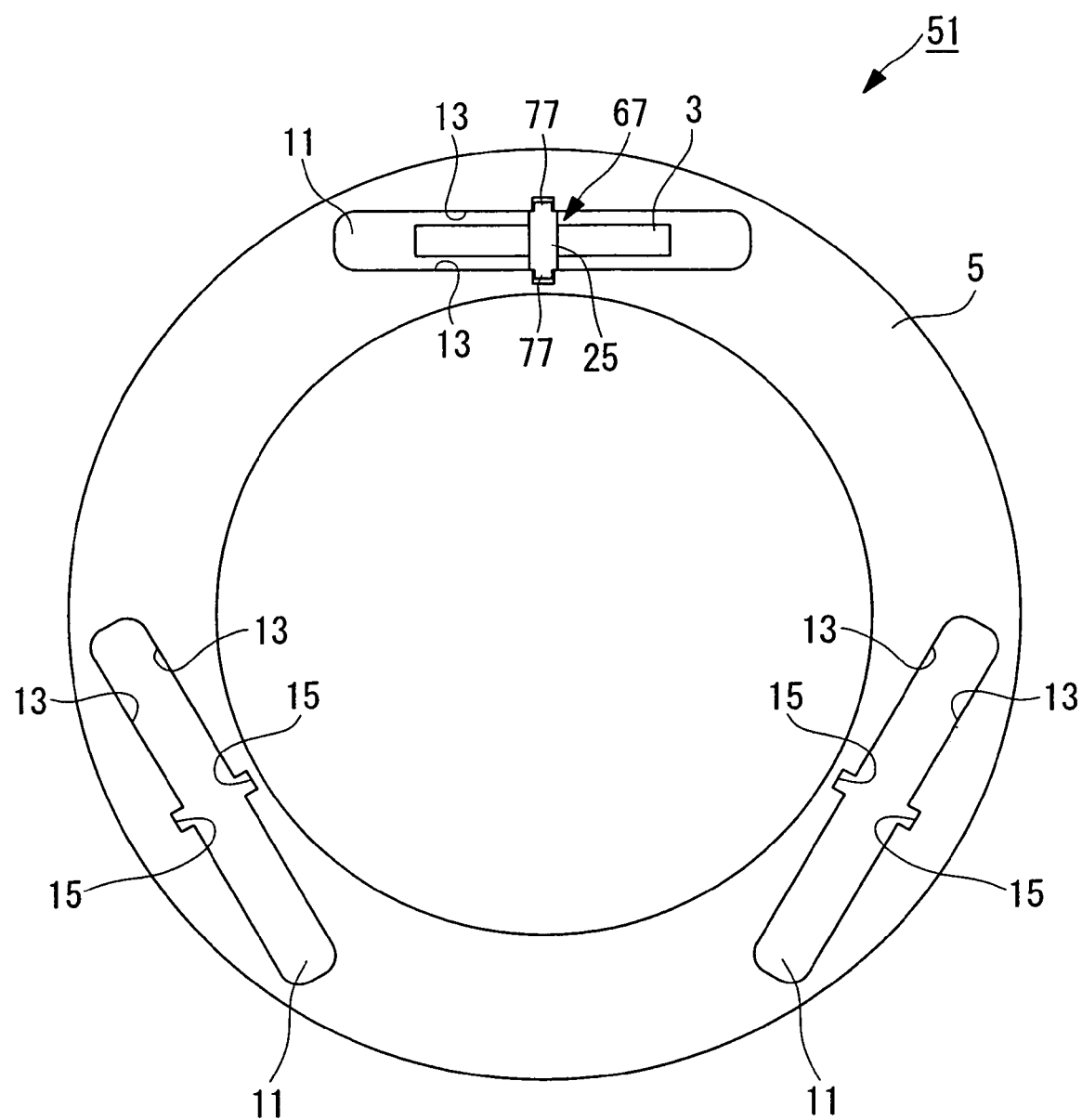
FIG. 6 is a plan view showing the configuration of an ultrasonic motor according to a second embodiment of the present invention.
Figure 7B:
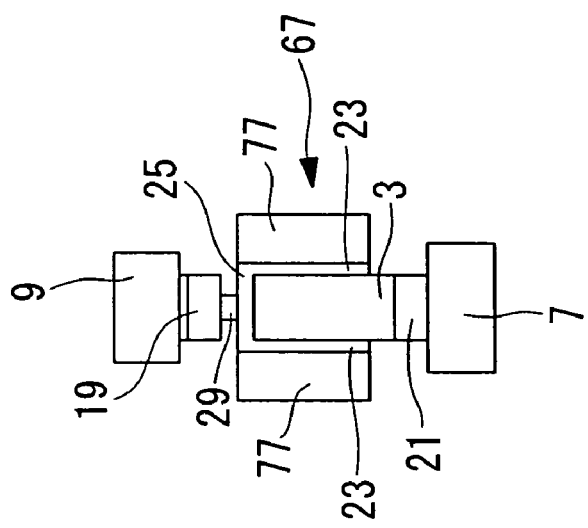
FIGS. 7A and 7B are diagrams showing the configuration of a piezoelectric device in FIG. 6.
Figure 7A:
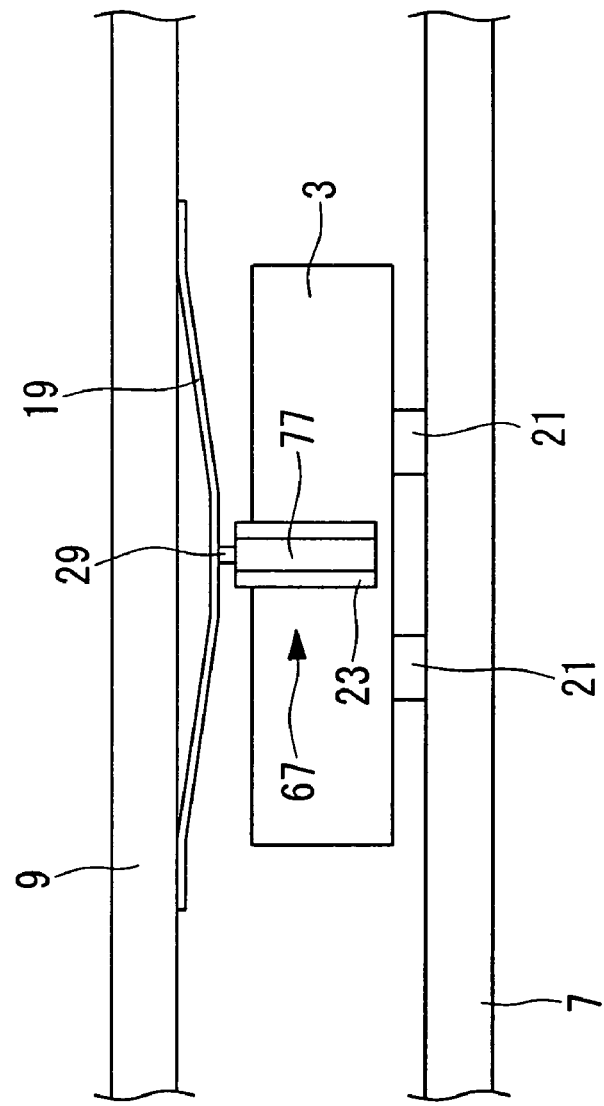

FIG. 6 is a plan view depicting the configuration of the ultrasonic motor according to this embodiment. FIGS. 7A and 7B are diagrams depicting a piezoelectric device in FIG. 6, wherein FIG. 7A shows the piezoelectric device as viewed from the radial direction of the ultrasonic motor, and FIG. 7B shows the piezoelectric device as viewed from the circumferential direction thereof.

The same reference numerals are assigned to the same constituent elements as in the first embodiment, and a description thereof is thus omitted.

As shown in FIGS. 6 and 7, an ultrasonic motor (ultrasonic driving apparatus) 51 is principally formed of a piezoelectric device 3, a case 5, a driven body 7, and a cover 9.

The piezoelectric device 3 includes a holding part (holding member) 67 for holding the piezoelectric device 3, a leaf spring 19 for urging the piezoelectric device 3 towards the driven body 7, and driving contact portions 21 that make contact with the driven body 7.

The holding part 67 is mainly formed of side-wall portions 23 and a base portion 25 for holding the piezoelectric device 3, plate-shaped protruding portions (positioning portions, projections) 77 that are formed so as to project from the side-wall portions 23 in the radial direction of the ultrasonic motor 51, and a pressing part 29 that is formed in the base portion 25.

The protruding portions 77 are disposed so as to extend in the direction along the central axis C and are disposed substantially at the center of the piezoelectric device 3, where a vibration node occurs.

In the ultrasonic motor 51 having the configuration described above, when the photoelectric device 3 is disposed in the locating hole 11, the side-wall portions 23 of the holding part 67 and the guide surfaces 13 of the locating hole 11 abut. Also, the protruding portions 77 of the holding part 67 are engaged so as to move along the guide grooves 15 of the locating hole 11.

As shown in FIGS. 6 and 7, with the configuration described above, the piezoelectric device 3 is positioned with a certain degree of precision by being disposed in the locating hole 11. More specifically, by abutting the side-wall portions 23 of the holding part 67 and the guide surfaces 13 of the locating hole 11, the piezoelectric device 3 is positioned with a certain degree of precision in the radial direction of the case 5. Furthermore, by engaging the protruding portions 77 of the holding part 67 with the guide grooves 15 of the locating hole 11, the piezoelectric device 3 is positioned with a certain degree of precision in the circumferential direction of the case 5.

Moreover, the protruding portions 77 can be formed more easily compared to the case where the pin portions 17 of the first embodiment are formed in the holding part 67, which simplifies the manufacture of the ultrasonic motor 51.

Third Embodiment

Next, a third embodiment of the present invention will be described with reference to FIGS. 8 and 9.

The basic configuration of the ultrasonic motor of this embodiment is the same as that of the first embodiment described above, but the configuration of a holding part is different from that in the first embodiment. Therefore, in the present embodiment, only the holding part will be described using FIGS. 8 and 9, and a description of a cover and other elements will be omitted.

Figure 8:
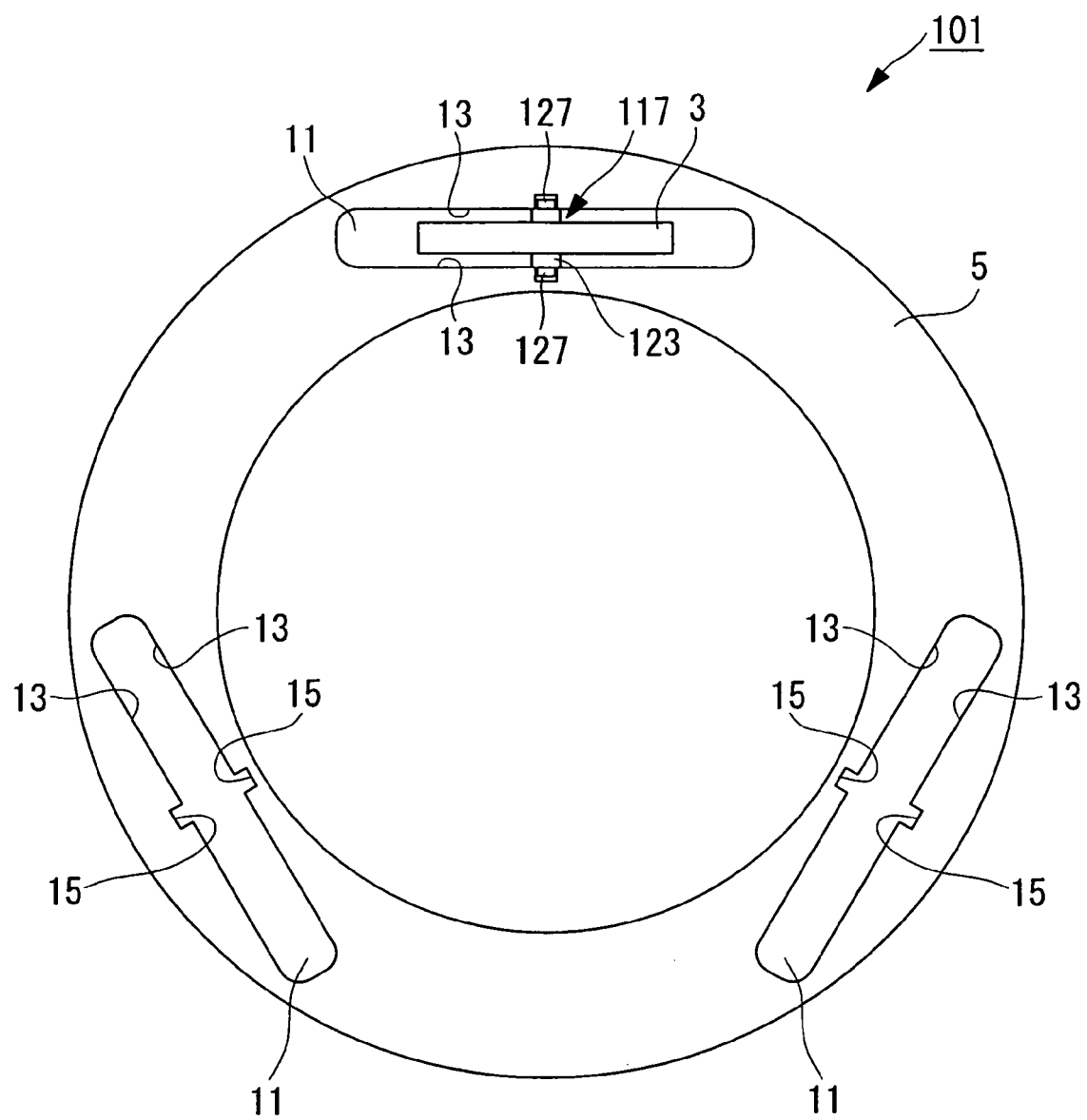
FIG. 8 is a plan view showing the configuration of an ultrasonic motor according to a third embodiment of the present invention.
Figure 9B:
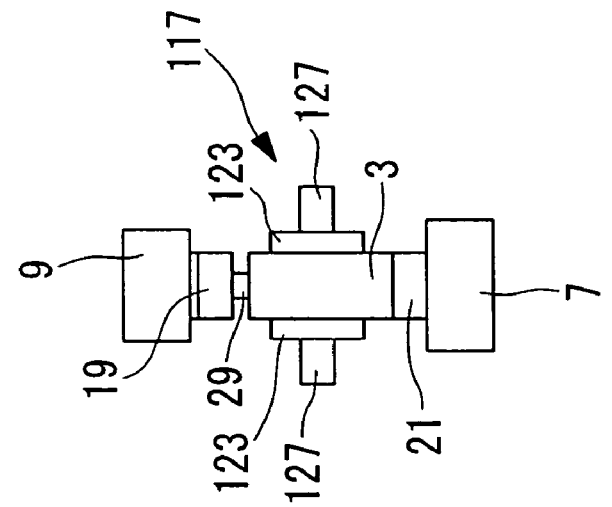
FIGS. 9A and 9B are diagrams illustrating the configuration of a piezoelectric device in FIG. 8.
Figure 9A:
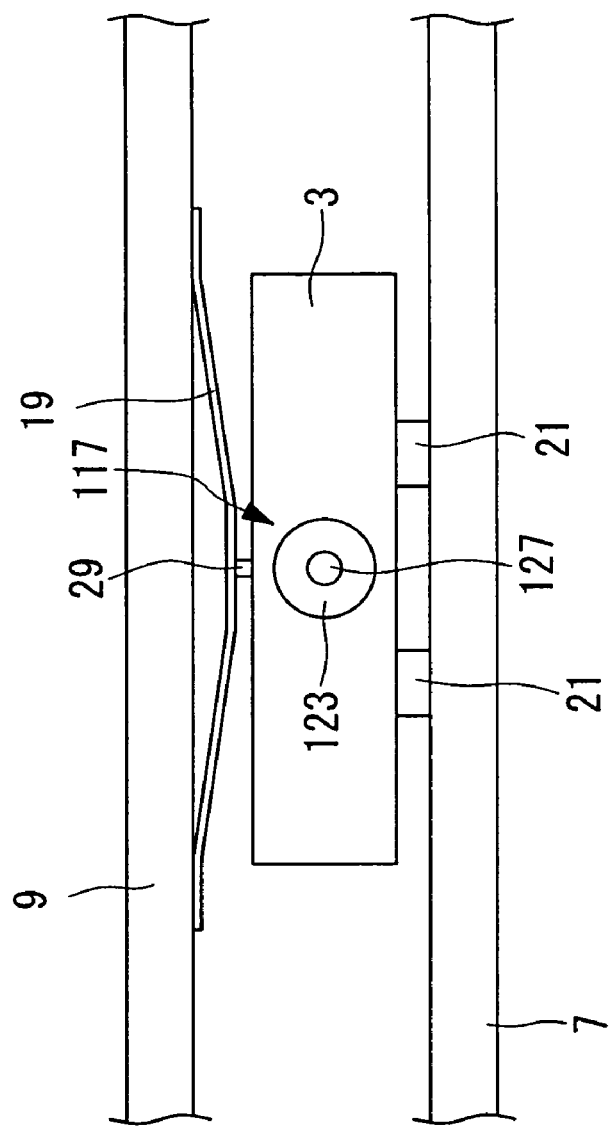

FIG. 8 is a plan view depicting the ultrasonic motor according to the present invention. FIGS. 9A and 9B are diagrams depicting the configuration of a piezoelectric device in FIG. 8, wherein FIG. 9A shows the piezoelectric device as viewed from the radial direction of the ultrasonic motor and FIG. 9B shows the piezoelectric device as viewed from the circumferential direction.

The same reference numerals are assigned to the same constituent elements as in the first embodiment and a description thereof is thus omitted.

As shown in FIGS. 8 and 9, an ultrasonic motor (ultrasonic driving apparatus) 101 is mainly formed of a piezoelectric device 3, a case 5, a driven body 7, and a cover 9.

The piezoelectric device 3 includes a holding part (holding member) 117 for holding the piezoelectric device 3, a leaf spring 19 for urging the piezoelectric device 3 towards the driven body 7, and driving contact portions 21 that make contact with the driven body 7.

The holding part 117 is mainly formed of substantially circular plate-shaped side-wall portions (positioning portions) 123 for holding the piezoelectric device 3 in the radial direction of the ultrasonic motor 101 and substantially cylindrical pin portions 127 that are formed so as protrude from the side-wall portions 123 in the radial direction of the ultrasonic motor 101.

The holding part 117 is positioned substantially at the center of the piezoelectric device 3, where a vibration node occurs, and likewise, the pin portions 127 are also positioned substantially at the center where the vibration node occurs.

In the ultrasonic motor 101 having the above-described configuration, when the piezoelectric device 3 is disposed in the locating hole 11, the side-wall portions 123 of the holding part 117 and the guide surfaces 13 of the locating hole 11 abut. Also, the pin portions 127 of the holding part 117 are engaged so as to move along the guide grooves 15 of the locating hole 11.

With the configuration described above, as shown in FIGS. 8 and 9, the piezoelectric device 3 is positioned with a certain degree of precision by being disposed in the locating hole 11. More specifically, by abutting the side-wall portions 123 of the holding part 117 and the guide surfaces 13 of the locating hole 11, the piezoelectric device 3 is positioned with a certain degree of precision in the radial direction of the case 5. Furthermore, by engaging the pin portions 127 of the holding part 117 with the guide grooves 15 of the locating hole 11, the piezoelectric device 3 is positioned with a certain degree of precision in the circumferential direction of the case 5.

Moreover, because the piezoelectric device 3 is supported only at the side-wall portions 123 of the holding part 117, the contact area of the piezoelectric device 3 and the holding part 117 is reduced. As a result, it is possible to prevent inhibition of the vibrations of the piezoelectric device 3 by the holding part 117, which improves the vibration generation characteristics.

In addition, because the holding part 117 has a simple circular shape, the processing thereof can be simplified, which contributes to reduced material costs.

Fourth Embodiment

Next, a fourth embodiment of the present invention will be described with reference to FIGS. 10 and 11.

The basic configuration of an ultrasonic motor of the present embodiment is the same as that of the first embodiment described above, but the configuration of a holding part is different from that in the first embodiment. Therefore, in the present embodiment, only the holding part will be described using FIGS. 10 and 11, and a description of a cover and other elements will be omitted.

Figure 10:
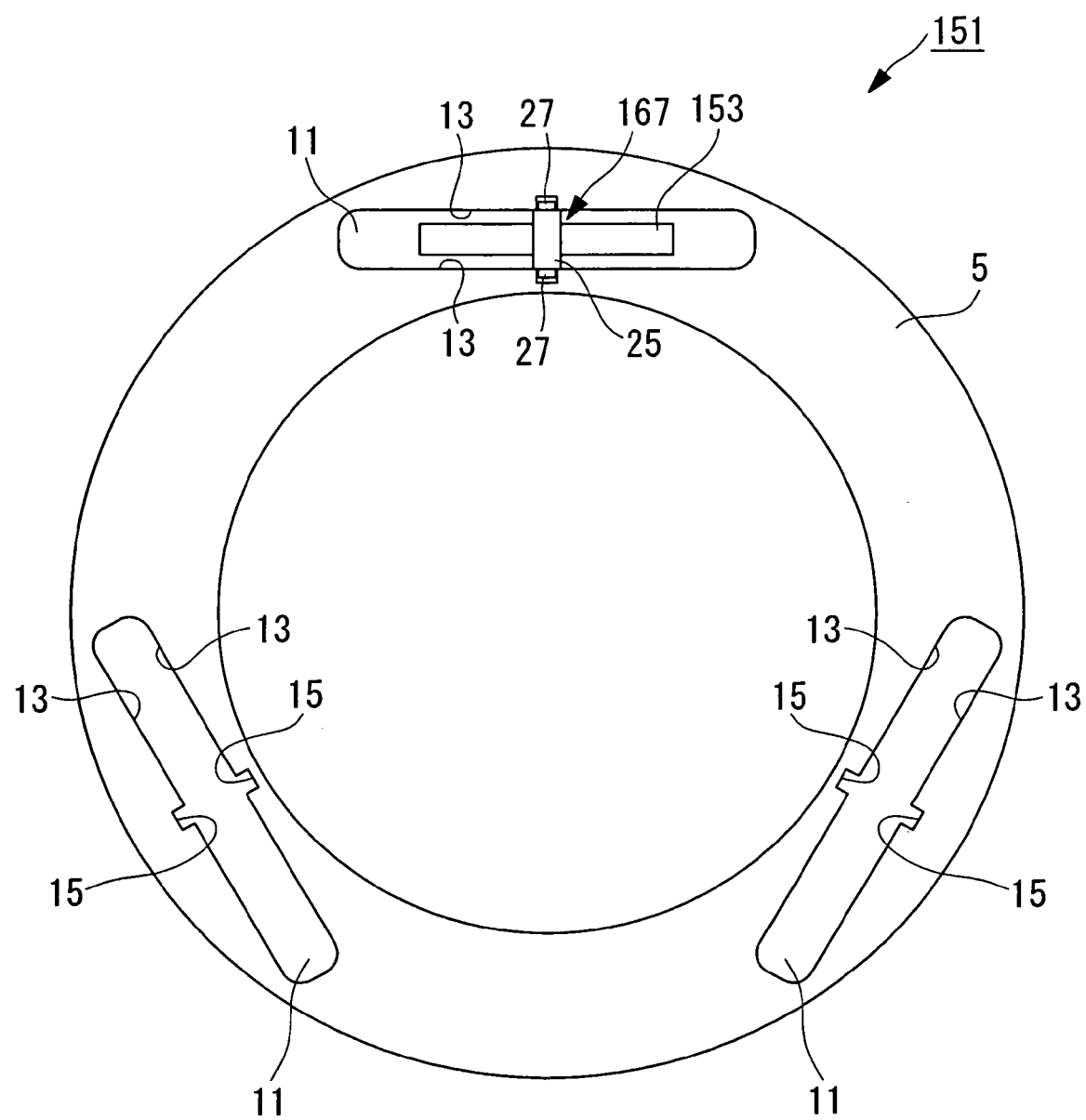
FIG. 10 is a plan view illustrating the configuration of an ultrasonic motor according to a fourth embodiment of the present invention.
Figure 11B:
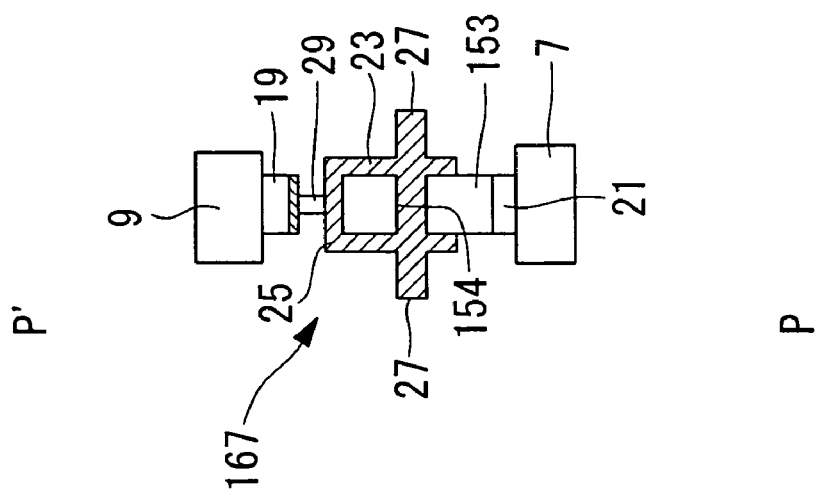
FIGS. 11A and 11B are diagrams showing a piezoelectric device in FIG. 10.
Figure 11A:
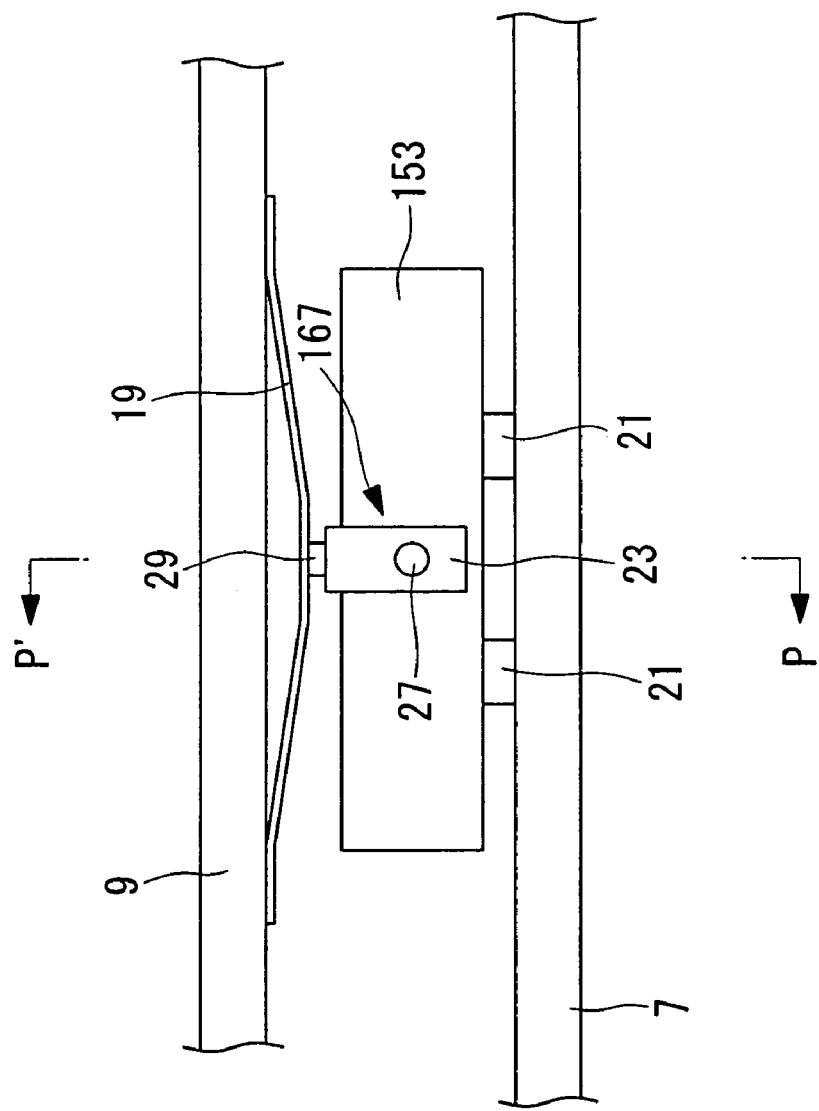

FIG. 10 is a plan view depicting the configuration of the ultrasonic motor according to the present embodiment. FIGS. 11A and 11B are diagrams depicting the configuration of a piezoelectric device in FIG. 10, wherein FIG. 11A shows the piezoelectric device as viewed from the radial direction of the ultrasonic motor and FIG. 11B is a cross-sectional view along line P-P' in FIG. 11A.

The same reference numerals are assigned to the same constituent elements as in the first embodiment and a description thereof will thus be omitted.

As shown in FIGS. 10 and 11, an ultrasonic motor (ultrasonic driving apparatus) 151 is mainly formed of a piezoelectric device (oscillator) 153, a case 5, a driven body 7, and a cover 9.

A through-hole 154 is formed substantially at the center of the piezoelectric device 153, where a vibration node occurs. The piezoelectric device 153 includes a holding part (holding member) 167 for holding the piezoelectric device 153, a leaf spring 19 for urging the piezoelectric device 3 towards the driven body 7, and driving contact portions 21 that make contact with the driven body 7.

In the holding part 167, side-wall portions 23, a base portion 25, and pin portions 27 that are formed so as to protrude from the side-wall portions 23 in the radial direction of the ultrasonic motor 151, these elements being provided for holding the piezoelectric device 3, are integrally formed from resin. The holding part 167 is outsert molded substantially at the center of the piezoelectric device 3, where a vibration node occurs, and the through-hole 154 is also filled with resin.

In the ultrasonic motor 151 having the configuration described above, when the piezoelectric device 153 is disposed in the locating hole 11, the side-wall portions 23 of the holding part 167 and the guide surfaces 13 of the locating hole 11 abut. Furthermore, the pin portions 27 of the holding part 167 are engaged so that they move along the guide grooves 15 of the locating hole 11.

With the configuration described above, as shown in FIGS. 10 and 11, the piezoelectric device 153 is positioned with a certain degree of precision by being disposed in the locating hole 11. More specifically, by abutting the side-wall portions 23 of the holding part 167 and the guide surfaces 13 of the locating hole 11, the piezoelectric device 153 is positioned with a certain degree of precision in the radial direction of the case 5. Furthermore, by engaging the pin portions 27 of the holding part 167 with the guide grooves 15 of the locating hole 11, the piezoelectric device 153 is positioned with a certain degree of precision in the circumferential direction of the case 5.

Because the side-wall portions 23, the base portion 25, and the pin portions 27 constituting the holding part 167 are integrally formed from resin, the number of component parts of the ultrasonic motor 151 can be reduced, and the number of processes for assembling the ultrasonic motor 151 can be reduced. Also, since the holding part 167 is outsert molded in the piezoelectric device 153, a process for attaching the holding part 167 to the piezoelectric device 153 can be eliminated, and material such as adhesive and so forth used for attachment can be eliminated.

Furthermore, because the through-hole 154 is filled with resin, the holding part 167 can be more reliably attached to the piezoelectric device 153.

Fifth Embodiment

Next, a fifth embodiment of the present invention will be described with reference to FIGS. 12 and 13.

The basic configuration of an ultrasonic motor of the present embodiment is the same as that of the first embodiment described above, but the configuration of a holding part is different from that in the first embodiment. Therefore, in the present embodiment, only the holding part shall be described using FIGS. 12 and 13, and the description of a cover and other elements shall be omitted.

Figure 12:
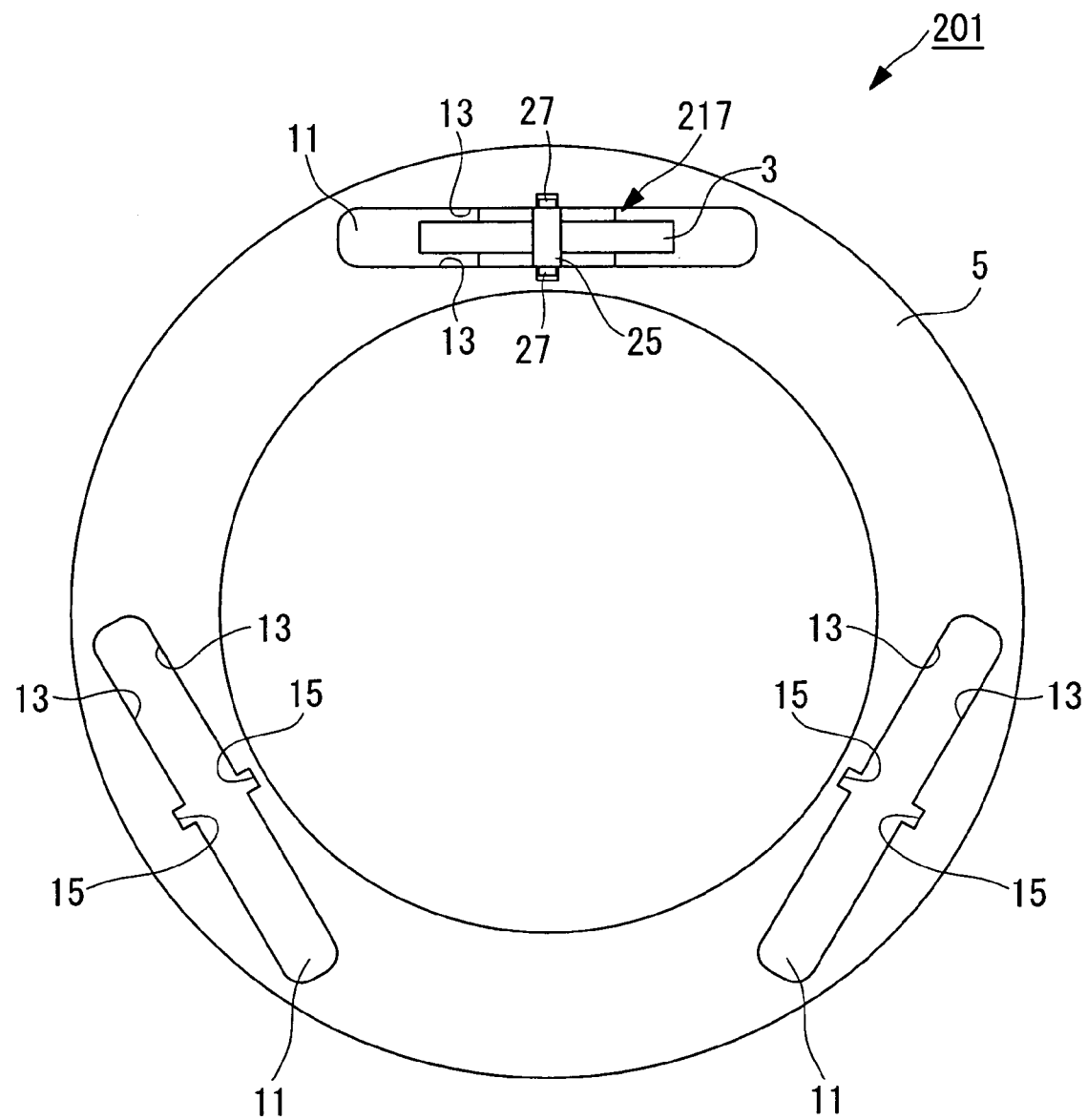
FIG. 12 is a plan view showing the configuration of an ultrasonic motor according to fifth embodiment of the present invention.
Figure 13B:
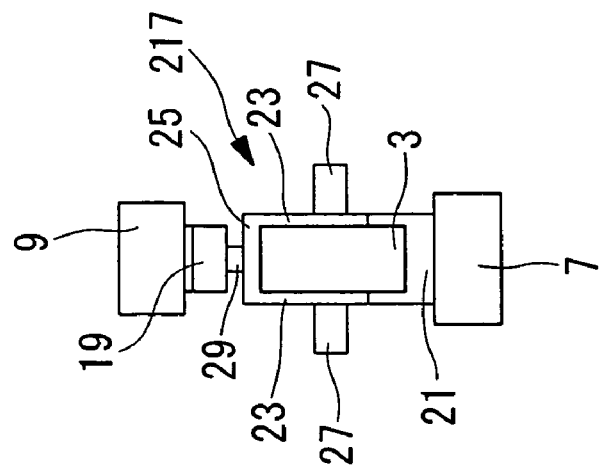
FIGS. 13A and 13B are diagrams showing the configuration of a piezoelectric device in FIG. 12.
Figure 13A:
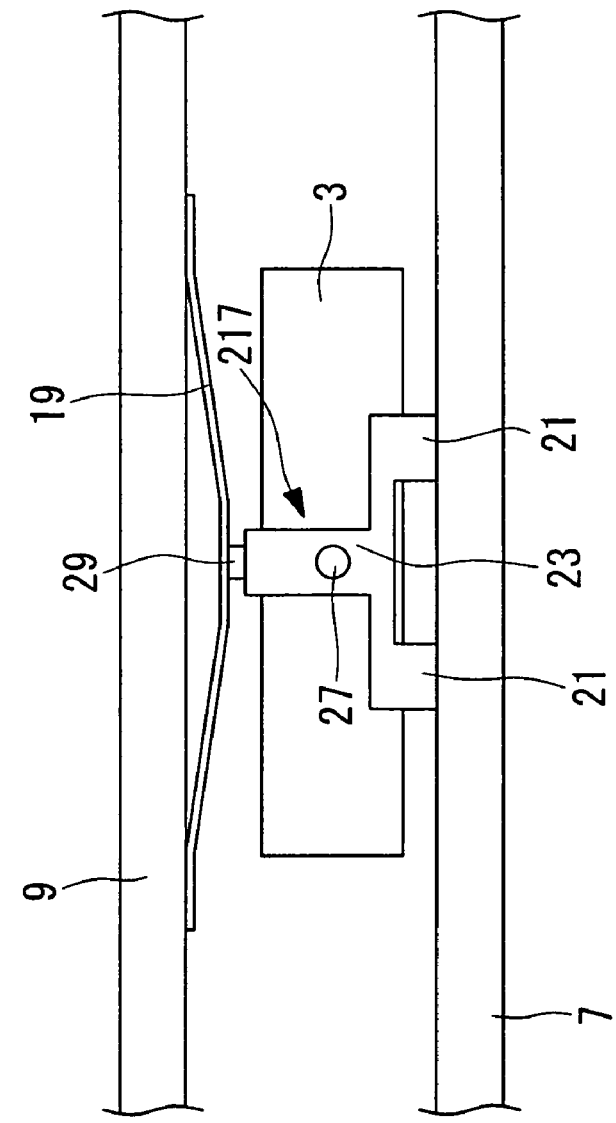

FIG. 12 is a plan view depicting the configuration of the ultrasonic motor according to the present embodiment. FIGS. 13A and 13B are diagrams illustrating the configuration of a piezoelectric device in FIG. 12, wherein FIG. 13A shows the piezoelectric device as viewed from the radial direction of the ultrasonic motor, and FIG. 13B shows the piezoelectric device as viewed from the circumferential direction thereof.

The same reference numerals are assigned to the same constituent elements as in the first embodiment, and a description thereof shall thus be omitted.

As shown in FIGS. 12 and 13, an ultrasonic motor (ultrasonic driving apparatus) 201 is mainly formed of a piezoelectric device 3, a case 5, a driven body 7, and a cover 9.

The piezoelectric device 3 includes a holding part (holding member) 217 for holding the piezoelectric device 3 and a leaf spring 19 for urging the piezoelectric device 3 towards the driven body 7.

The holding part 217 is integrally formed of side-wall portions 23 for holding the piezoelectric device 3, a base portion 25, pin portions 27 that are formed to protrude from the side-wall portions 23 in the radial direction of the ultrasonic motor 201, and driving contact portions 21 that make contact with the driven body 7. The holding part 217 is outsert molded substantially at the center of the piezoelectric device 3, where a vibration node occurs.

The resin for forming the holding part 217 can be a resin used for molding, that is, a resin composition made of 40 to 60 parts by weight of thermoplastic resin, 15 to 30 parts by weight of potassium titanate whiskers, and 5 to 15 parts by weight of polytetrafluoroethylene powder. A specific example is a composite material including polyphenylene sulfide (PPS), which is a superengineering plastic, as a base and potassium titanate fibers (for example, Tismo (registered trademark)).

In the ultrasonic motor 201 having the configuration described above, when the piezoelectric device 3 is disposed in the locating hole 11, the side-wall portions 23 of the holding part 217 and the guide surfaces 13 of the locating hole 11 abut. Also, the pin portions 27 of the holding part 217 are engaged so that they moves along the grooves 15 of the locating hole 11.

With the configuration described above, as shown in FIGS. 12 and 13, the piezoelectric device 3 is positioned with a certain degree of precision by being disposed in the locating hole 11. More specifically, by abutting the side-wall portions 23 of the holding part 217 and the guide surfaces 13 of the locating hole 11, the piezoelectric device 3 is positioned with a certain degree of precision in the radial direction of the case 5. Also, by engaging the pin portions 27 of the holding part 217 in the guide grooves 15 of the locating hole 11, the piezoelectric device 3 is positioned with a certain degree of precision in the circumferential direction of the case 5.

By forming the holding part 217 of the above-described resin material, the driving contact portions 21 can maintain the abrasion-resistance characteristics required for driving the driven body 7, and the driving contact portions 21 can be integrally molded with the holding part 217 so as to project therefrom.

Because the side-wall portions 23, the base portion 25, the pin portions 27, and the driving contact portions 21 constituting the holding part 217 are integrally formed of resin, the number of component parts of the ultrasonic motor 201 can be reduced, and the number of steps for assembling the ultrasonic motor 201 can also be reduced. Furthermore, since the holding part 217 is outsert molded in the piezoelectric device 3, a process for attaching the holding part 217 to the piezoelectric device 3 can be eliminated, and materials used for attachment, such as adhesives and so forth, can be eliminated.

Sixth Embodiment

Next, a sixth embodiment of the present invention will be described with reference to FIGS. 14 and 15.

The basic configuration of an ultrasonic motor according to the present embodiment is the same as that of the first embodiment described above, but the configuration of a holding part is different from that in the first embodiment. Therefore, in this embodiment, only the holding part will be described using FIGS. 14 and 15, and the description of a cover and other elements will be omitted.

Figure 14:
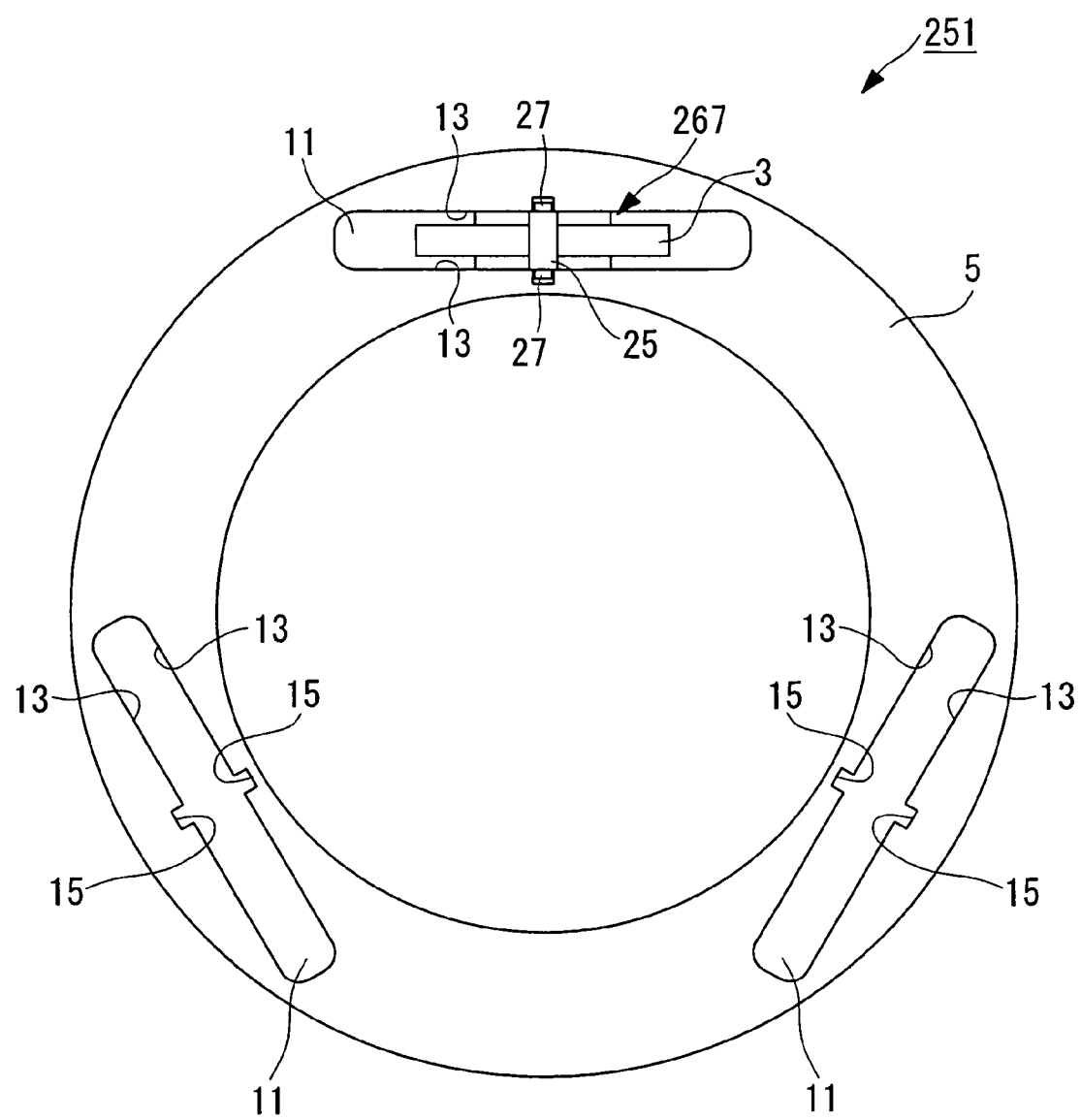
FIG. 14 is a plan view showing the configuration of an ultrasonic motor according to a sixth embodiment of the present invention.
Figure 15B:
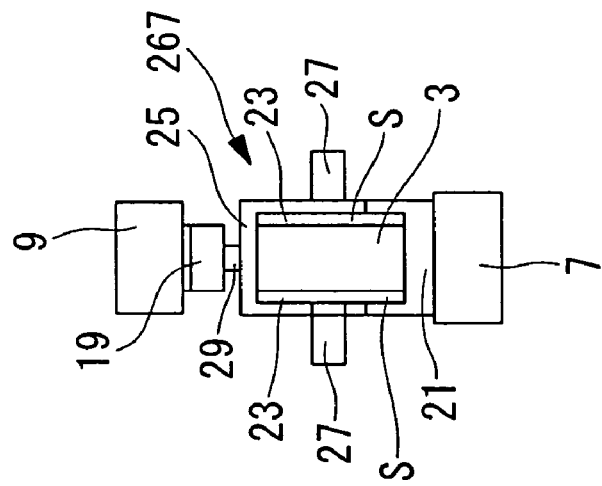
FIGS. 15A and 15B are diagrams showing the configuration of a piezoelectric device in FIG. 14.
Figure 15A:
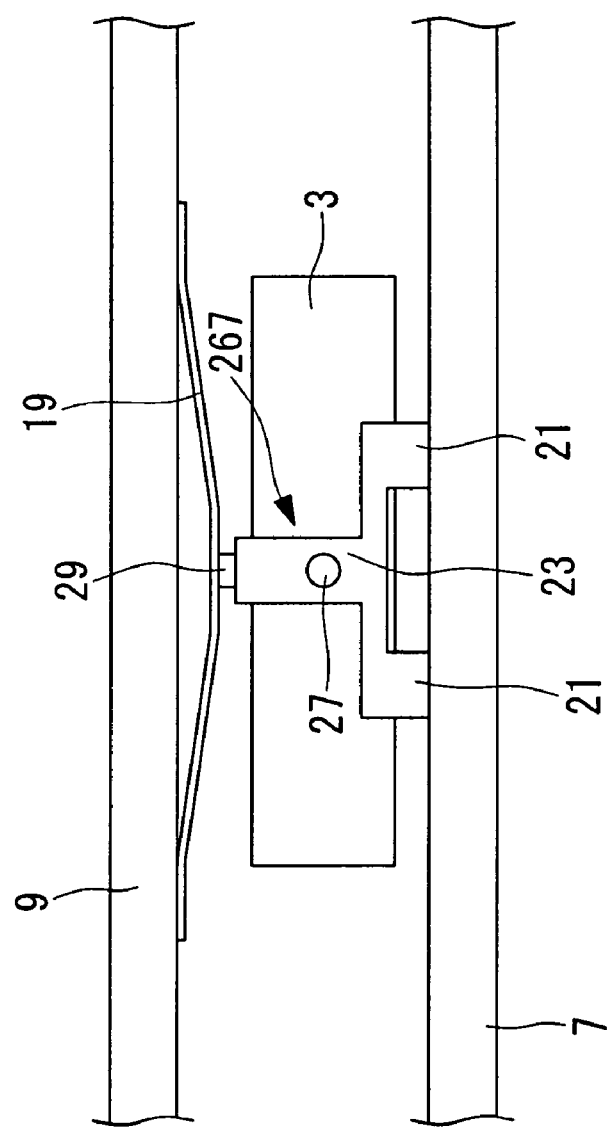

FIG. 14 is a plan view illustrating the configuration of the ultrasonic motor according to the present embodiment. FIGS. 15A and 15B are diagrams illustrating the configuration of a piezoelectric device, wherein FIG. 15A shows the piezoelectric device as viewed from the radial direction of the ultrasonic motor, and FIG. 15B shows the piezoelectric device as viewed from the circumferential direction thereof.

The same reference numerals are assigned to the same constituent elements as in the first embodiment, and a description thereof shall thus be omitted.

As shown in FIGS. 14 and 15, an ultrasonic motor (ultrasonic driving apparatus) 251 is mainly formed of a piezoelectric device 3, a case 5, a driven body 7, and a cover 9.

The piezoelectric device 3 includes a holding part (holding member) 267 for holding the piezoelectric device 3 and a leaf spring 19 for urging the piezoelectric device 3 towards the driven body 7.

The holding part 267 is made of resin and is integrally formed of side-wall portions 23 and a base portion 25 for holding the piezoelectric device 3, pin portions 27 that are formed so as to protrude in the radial direction of the ultrasonic motor 251 from the side-wall portions 23, and driving contact portions 21 that make contact with the driven body 7. The holding part 267 is outsert molded substantially at the center of the piezoelectric device 3, where a vibration node occurs.

Also, a predetermined gap S is formed between the piezoelectric device 3 and the side-wall portions 23.

The resin from which the holding part 267 is formed may be the same type of resin as used in the fifth embodiment described above.

In the ultrasonic motor 251 having the configuration described above, when the piezoelectric device 3 is disposed in the locating hole 11, the side-wall portions 23 of the holding part 267 and the guide surfaces 13 of the locating hole 11 abut. Also, the pin portions 27 of the holding part 267 are engaged so that they moves along the guide grooves 15 in the locating hole 11.

With the configuration described above, as shown in FIGS. 14 and 15, the piezoelectric device 3 is positioned with a certain degree of precision by being disposed in the locating hole 11. More specifically, by abutting the side-wall portions 23 of the holding part 267 and the guide surfaces 13 of the locating holes 11, the piezoelectric device 3 is positioned with a certain degree of precision in the radial direction of the case 5. Also, by engaging the pin portions 27 of the holding part 267 with the guide grooves 15 of the locating hole 11, the piezoelectric device 3 is positioned with a certain degree of precision in the circumferential direction of the case 5.

Since the gap S is formed between the piezoelectric device 3 and the side-wall portions 23, the side-wall portions 23 do not make contact with the piezoelectric device 3. Therefore, it is possible to prevent the vibrations of the piezoelectric device 3 from being inhibited, and it is thus possible to prevent a deterioration in the vibration efficiency of the piezoelectric device 3.

Seventh Embodiment

Next, a seventh embodiment of the present invention will be described with reference to FIGS. 16 and 17.

The basic configuration of an ultrasonic motor of the present embodiment is the same as that of the first embodiment described above, but the configuration of a holding part is different from that in the first embodiment. Therefore, in the present embodiment, only the holding part will be described using FIGS. 16 and 17, and the description of a cover and other elements will be omitted.

Figure 16:
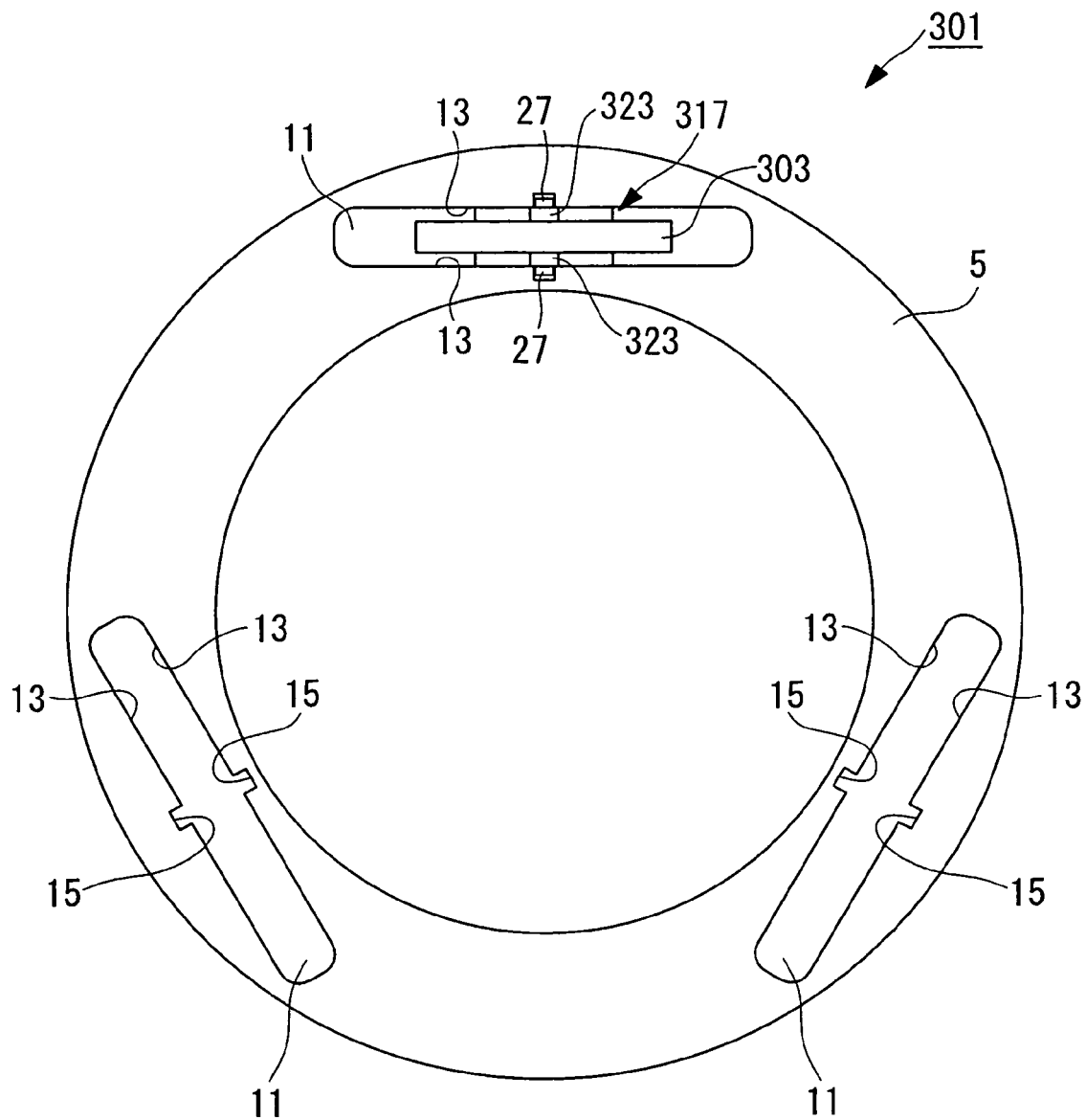
FIG. 16 is a plan view showing the configuration of an ultrasonic motor according to a seventh embodiment of the present invention.

FIG. 16 is a plan view illustrating the configuration of the ultrasonic motor according to the present embodiment. FIGS. 17A, 17B, and 17C are diagrams illustrating the configuration of a piezoelectric device in FIG. 16, wherein FIG. 17A shows the piezoelectric device as viewed from the radial direction of the ultrasonic motor, FIG. 17B shows the piezoelectric device as viewed from the circumferential direction thereof, and FIG. 17C is a cross-sectional view through line Q-Q' in FIG. 17A.

The same reference numerals are assigned to the same constituent elements as in the first embodiment, and a description thereof shall thus be omitted.

As shown in FIGS. 16 and 17, an ultrasonic motor (ultrasonic driving apparatus) 301 is mainly formed of a piezoelectric device (oscillator) 303, a case 5, a driven body 7, and a cover 9.

A through-hole 304 is formed substantially at the center of the piezoelectric device 303, where a vibration node occurs. The piezoelectric device 303 includes a holding part (holding member) 317 for holding the piezoelectric device 303 and a leaf spring 19 for urging the piezoelectric device 303 towards the driven body 7.

The holding part 317 is made from resin and is integrally formed of side-wall portions (positioning portions) 323 for holding the piezoelectric device 303, pin portions 27 that are formed so as to protrude in the radial direction of the ultrasonic motor 301 from the side-wall portions 232, and driving contact portions 21 that make contact with the driven body 7. The holding part 317 is outsert molded substantially at the center of the piezoelectric device 303 where the vibration node occurs, and the through-hole 304 is also filled with resin.

The resin from which the holding part 317 is formed may be the same resin as used in the fifth embodiment described above.

In the ultrasonic motor 301 having the configuration described above, when the piezoelectric device 303 is disposed in the locating hole 11, the side-wall portions 323 of the holding part 317 and the guide surfaces 13 of the locating hole 11 abut. Also, the pin portions 27 of the holding part 317 are engaged so that they move along the guide grooves 15 in the locating hole 11.

With the configuration described above, as shown in FIGS. 16 and 17, the piezoelectric device 303 is positioned with a certain degree of precision by being disposed in the locating hole 11. More specifically, by abutting the side-wall portions 323 of the holding part 317 and the guide surfaces 13 of the locating hole 11, the piezoelectric device 303 is positioned with a certain degree of precision in the radial direction of the case 5. Also, by engaging the pin portions 27 of the holding part 317 with the guide grooves 15 in the locating hole 11, the piezoelectric device 303 is positioned with a certain degree of precision in the circumferential direction of the case 5.

Because the piezoelectric device 303 is supported only at the side-wall portions 323 of the holding part 317, the contact area between the piezoelectric devices 3 and the holding part 317 is small. As a result, it is possible to prevent inhibition of the vibrations of the piezoelectric device 303 with the holding part 317, and the vibration generation efficiency can thus be improved.

In addition, because the through-hole 304 is also filled with resin, the holding part 317 can be reliably attached using the piezoelectric device 303.

The scope of the present invention is not limited to the embodiments described above; various modifications are possible so long as they do not depart from the spirit of the present invention.

For example, although this invention has been applied to a driving apparatus for a camera lens, the present invention is not limited to a driving apparatus for a lens; it may also be applied to various other types of driving apparatuses.

What is claimed is:

1. An ultrasonic driving apparatus comprising:
   an oscillator for generating vibrations when supplied with electrical power;
   a holding member fixed to the oscillator;
   an urging member for urging the oscillator in a predetermined direction; and
   a support member for supporting the holding member so as to be capable of moving in the predetermined direction, wherein positioning portions for setting, with a certain degree of precision, the position of the oscillator which is projected onto a plane substantially orthogonal to the predetermined direction are provided in the holding member and the support member;

the holding member includes a pair of side-wall portions which sandwich at least the oscillator in a direction intersecting the predetermined direction;

the positioning portions include projections that protrude from the side-wall portion-and groove portions, extending in the predetermined direction in opposing faces that contact the side-wall portions, for accommodating the projections in such a manner that the projections are capable of moving in the predetermined direction;

the holding member includes a base portion that joins the pair of side-wall portions;

the oscillator is pressed by the urging member, via the base portion; and the base portion is fixed at a contact face contacting the oscillator.

2. An ultrasonic driving apparatus according to claim 1, wherein a gap is formed between the oscillator and the side-wall portions.

3. An ultrasonic driving apparatus comprising:

an oscillator for generating vibrations when supplied with electrical power;

a holding member fixed to the oscillator;

an urging member for urging the oscillator in a predetermined direction; and a support member for supporting the holding member so as to be capable of moving in the predetermined direction, wherein positioning portions for setting, with a certain degree of precision, the position of the oscillator which is projected onto a plane substantially orthogonal to the predetermined direction are provided in the holding member and the support member;

the holding member includes a pair of side-wall portions which sandwich at least the oscillator in a direction intersecting the predetermined direction;

the positioning portions include projections that protrude from the side-wall portion-and groove portions, extending in the predetermined direction in opposing faces that contact the side-wall portions, for accommodating the projections in such a manner that the projections are capable of moving in the predetermined direction;

the holding member includes a base portion that joins the pair of side-wall portions;

the oscillator is pressed by the urging member, via the base portion; and the side-wall portions and the base portion are fixed at a contact face contacting the oscillator.

4. An ultrasonic driving apparatus comprising:

an oscillator for generating vibrations when supplied with electrical power;

a holding member fixed to the oscillator;

an urging member for urging the oscillator in a predetermined direction;

a support member for supporting the holding member so as to be capable of moving in the predetermined direction, a driven body that is driven by vibrations generated by the oscillator; and a driving contact portion disposed between the oscillator and the driven body, wherein positioning portions for setting, with a certain degree of precision, the position of the oscillator which is projected onto a plane substantially orthogonal to the predetermined direction are provided in the holding member and the support member;

the holding member includes a pair of side-wall portions which sandwich at least the oscillator in a direction intersecting the predetermined direction;

the positioning portions include projections that protrude from the side-wall portion-and groove portions, extending in the predetermined direction in opposing faces that contact the side-wall portions, for accommodating the projections in such a manner that the projections are capable of moving in the predetermined direction;

the holding member includes a base portion that joins the pair of side-wall portions;

the oscillator is pressed by the urging member, via the base portion;

the holding member is formed of resin;

the holding member is integrally formed with the positioning portions and is fixed to the oscillator; and the driving contact portion is integrally formed with the holding member.

5. An ultrasonic driving apparatus comprising:

an oscillator for generating vibrations when supplied with electrical power;

a holding member fixed to the oscillator;

an urging member for urging the oscillator in a predetermined direction; and a support member for supporting the holding member so as to be capable of moving in the predetermined direction, wherein positioning portions for setting, with a certain degree of precision, the position of the oscillator which is projected onto a plane substantially orthogonal to the predetermined direction are provided in the holding member and the support member;

the holding member includes a pair of side-wall portions which sandwich at least the oscillator in a direction intersecting the predetermined direction;

the positioning portions include projections that protrude from the side-wall portion-and groove portions, extending in the predetermined direction in opposing faces that contact the side-wall portions, for accommodating the projections in such a manner that the projections are capable of moving in the predetermined direction;

the holding member includes a base portion that joins the pair of side-wall portions;

the oscillator is pressed by the urging member, via the base portion;

the holding member is formed of resin;

the holding member is integrally formed with the positioning portions and is fixed to the oscillator;

a through-hole, extending in a direction intersecting the vibration direction, is formed at the position of a vibration node in the oscillator; and in the region where the through-hole is formed, at least the holding member is integrally formed with the oscillator.

6. An ultrasonic driving apparatus according to claim 4, wherein:

a through-hole, extending in a direction intersecting the vibration direction, is formed at the position of a vibration node in the oscillator; and in the region where the through-hole is formed, at least the holding member is integrally formed with the oscillator.

7. An ultrasonic driving apparatus comprising:

an oscillator for generating vibrations when supplied with electrical power;

a holding member fixed to the oscillator;

an urging member for urging the oscillator in a predetermined direction;

a support member for supporting the holding member so as to be capable of moving in the predetermined direction, a driven body that is driven by vibrations generated by the oscillator; and a driving contact portion disposed between the oscillator and the driven body, wherein positioning portions for setting, with a certain degree of precision, the position of the oscillator which is projected onto a plane substantially orthogonal to the predetermined direction are provided in the holding member and the support member;

the holding member includes a pair of side-wall portions which sandwich at least the oscillator in a direction intersecting the predetermined direction;

the positioning portions include projections that protrude from the side-wall portion-and groove portions, extending in the predetermined direction in opposing faces that contact the side-wall portions, for accommodating the projections in such a manner that the projections are capable of moving in the predetermined direction;

the holding member includes a base portion that joins the pair of side-wall portions;

the oscillator is pressed by the urging member, via the base portion; and the driving contact portion is outsert molded to form an integral piece with the holding member, and a gap is formed between the oscillator and the side-wall portions.

8. An ultrasonic driving apparatus comprising:

an oscillator for generating vibrations when supplied with electrical power;

a holding member fixed to the oscillator;

an urging member for urging the oscillator in a predetermined direction; and a support member for supporting the holding member so as to be capable of moving in the predetermined direction, wherein positioning portions for setting, with a certain degree of precision, the position of the oscillator which is projected onto a plane substantially orthogonal to the predetermined direction are provided in the holding member and the support member;

the holding member includes a pair of side-wall portions which sandwich at least the oscillator in a direction intersecting the predetermined direction;

the positioning portions include projections that protrude from the side-wall portion-and groove portions, extending in the predetermined direction in opposing faces that contact the side-wall portions, for accommodating the projections in such a manner that the projections are capable of moving in the predetermined direction; and the side-wall portions are fixed at a contact face contacting the oscillator.

9. An ultrasonic driving apparatus comprising:

an oscillator for generating vibrations when supplied with electrical power;

a holding member fixed to the oscillator;

an urging member for urging the oscillator in a predetermined direction;

a support member for supporting the holding member so as to be capable of moving in the predetermined direction, a driven body that is driven by vibrations generated by the oscillator; and a driving contact portion disposed between the oscillator and the driven body, wherein positioning portions for setting, with a certain degree of precision, the position of the oscillator which is projected onto a plane substantially orthogonal to the predetermined direction are provided in the holding member and the support member;

the holding member includes a pair of side-wall portions which sandwich at least the oscillator in a direction intersecting the predetermined direction;

the positioning portions include projections that protrude from the side-wall portion-and groove portions, extending in the predetermined direction in opposing faces that contact the side-wall portions, for accommodating the projections in such a manner that the projections are capable of moving in the predetermined direction;

the holding member is formed of resin;

the holding member is integrally formed with the positioning portion and is fixed to the oscillator; and the driving contact portion is integrally formed with the holding member.

10. An ultrasonic driving apparatus according to claim 9, wherein:

a through-hole, extending in a direction intersecting the vibration direction, is formed at the position of a vibration node in the oscillator; and in the region where the though-hole is formed, at least the holding member is integrally formed with the oscillator.

11. An ultrasonic driving apparatus comprising:

an oscillator for generating vibrations when supplied with electrical power;

a holding member fixed to the oscillator;

an urging member for urging the oscillator in a predetermined direction; and a support member for supporting the holding member so as to be capable of moving in the predetermined direction, wherein positioning portions for setting, with a certain degree of precision, the position of the oscillator which is projected onto a plane substantially orthogonal to the predetermined direction are provided in the holding member and the support member;

the holding member includes a pair of side-wall portions which sandwich at least the oscillator in a direction intersecting the predetermined direction;

the positioning portions include projections that protrude from the side-wall portion-and groove portions, extending in the predetermined direction in opposing faces that contact the side-wall portions, for accommodating the projections in such a manner that the projections are capable of moving in the predetermined direction;

the holding member is formed of resin;

the holding member is integrally formed with the positioning portion and is fixed to the oscillator;

a through-hole, extending in a direction intersecting the vibration direction, is formed at the position of a vibration node in the oscillator; and in the region where the through-hole is formed, at least the holding member is integrally formed with the oscillator.

12. An ultrasonic driving apparatus comprising:

an oscillator for generating vibrations when supplied with electrical power;

a holding member fixed to the oscillator;

an urging member for urging the oscillator in a predetermined direction;

a support member for supporting the holding member so as to be capable of moving in the predetermined direction, a driven body that is driven by vibrations generated by the oscillator; and a driving contact portion disposed between the oscillator and the driven body, wherein positioning portions for setting, with a certain degree of precision, the position of the oscillator which is projected onto a plane substantially orthogonal to the predetermined direction are provided in the holding member and the support member;

the holding member includes a pair of side-wall portions which sandwich at least the oscillator in a direction intersecting the predetermined direction;

the positioning portions include projections that protrude from the side-wall portion-and groove portions, extending in the predetermined direction in opposing faces that contact the side-wall portions, for accommodating the projections in such a manner that the projections are capable of moving in the predetermined direction;

the holding member is formed of resin;

the holding member is integrally formed with the positioning portion and is fixed to the oscillator; and the driving contact portion is outsert molded to form a single piece with the holding member, and a gap is formed between the oscillator and the side-wall portions.

\* \* \* \* \*